US007363308B2

(12) United States Patent
Dillon et al.

(10) Patent No.: US 7,363,308 B2
(45) Date of Patent: Apr. 22, 2008

(54) SYSTEM AND METHOD FOR OBTAINING KEYWORD DESCRIPTIONS OF RECORDS FROM A LARGE DATABASE

(75) Inventors: Craig Dillon, San Diego, CA (US); Richard Howe, San Diego, CA (US); Nicolaas A. van Goor, Shoreview, MN (US); Sachin Sarnobat, San Diego, CA (US); Russell W. Anderson, Oceanside, CA (US); Jason Lenderman, Los Angeles, CA (US); Gordon Cameron, Brookhaven, PA (US)

(73) Assignee: Fair Isaac Corporation, Minneapolis, MN (US)

( * ) Notice: Subject to any disclaimer, the term of this patent is extended or adjusted under 35 U.S.C. 154(b) by 1140 days.

(21) Appl. No.: 10/032,843

(22) Filed: Dec. 27, 2001

(65) Prior Publication Data

US 2003/0088562 A1  May 8, 2003

Related U.S. Application Data

(60) Provisional application No. 60/265,780, filed on Feb. 1, 2001, provisional application No. 60/258,575, filed on Dec. 28, 2000.

(51) Int. Cl.
*G06F 7/00* (2006.01)
(52) U.S. Cl. .................................................. 707/101
(58) Field of Classification Search ......... 707/1–104.1, 707/200; 706/45–46, 50, 55, 11; 714/1, 714/2, 15, 100; 705/1, 28, 30
See application file for complete search history.

(56) References Cited

U.S. PATENT DOCUMENTS 5,812,668 A * 9/1998 Weber .......................... 705/79

(Continued)

FOREIGN PATENT DOCUMENTS

WO    WO 01/13304 A1    2/2001

OTHER PUBLICATIONS

Khan, I. "Personal Adaptive Web Agent: A Tool for Information Filtering": Proceedings of the 1997 IEEE Conference on Electrical and Computer Engineering, p. 306, May 1997, pp. 1-6.

*Primary Examiner*—Don Wong
*Assistant Examiner*—Linh Black
(74) *Attorney, Agent, or Firm*—Mintz, Levin, Cohn, Ferris, Glovsky and Popeo, P.C.

(57) ABSTRACT

A computerized system for augmenting data from a source database with data from a reference database to generate an augmented database that can be used for predictive modeling is disclosed. The present invention includes a method for using the Internet to obtain information, including, reading a data record stored in a field of data, searching a database for information describing the data record, condensing the information describing the data record into a value description, associating the value description with the data record, and augmenting the field of data with the value description associated with the data. The present invention also includes a computerized system for augmenting data from a source database with data from a reference database to generate an augmented database that can be used for predictive modeling and data mining to conduct searches of data in the augmented database.

14 Claims, 25 Drawing Sheets

U.S. PATENT DOCUMENTS

| | | | |
|---|---|---|---|
| 5,819,092 A * | 10/1998 | Ferguson et al. | 717/113 |
| 5,826,249 A * | 10/1998 | Skeirik | 706/25 |
| 5,941,944 A | 8/1999 | Messerly | 709/203 |
| 6,048,271 A * | 4/2000 | Barcelou | 463/48 |
| 6,098,065 A | 8/2000 | Skillen et al. | 707/3 |
| 6,128,624 A * | 10/2000 | Papierniak et al. | 707/104.1 |
| 6,134,532 A * | 10/2000 | Lazarus et al. | 705/14 |
| 6,134,548 A * | 10/2000 | Gottsman et al. | 707/5 |
| 6,233,575 B1 * | 5/2001 | Agrawal et al. | 707/6 |
| 6,263,334 B1 * | 7/2001 | Fayyad et al. | 707/5 |
| 6,263,335 B1 * | 7/2001 | Paik et al. | 707/5 |
| 6,266,664 B1 | 7/2001 | Russell-Falla et al. | 707/5 |
| 6,266,668 B1 * | 7/2001 | Vanderveldt et al. | 707/10 |
| 6,275,824 B1 * | 8/2001 | O'Flaherty et al. | 707/9 |
| 6,314,420 B1 * | 11/2001 | Lang et al. | 707/3 |
| 6,317,718 B1 * | 11/2001 | Fano | 705/1 |
| 6,327,574 B1 * | 12/2001 | Kramer et al. | 705/14 |
| 6,385,539 B1 * | 5/2002 | Wilson et al. | 701/213 |
| 6,430,539 B1 * | 8/2002 | Lazarus et al. | 705/10 |
| 6,460,036 B1 * | 10/2002 | Herz | 707/10 |
| 6,470,307 B1 * | 10/2002 | Turney | 704/9 |
| 6,523,041 B1 * | 2/2003 | Morgan et al. | 707/102 |
| 6,553,270 B1 * | 4/2003 | Houle et al. | 700/54 |
| 6,584,447 B1 * | 6/2003 | Fox et al. | 705/10 |
| 6,606,744 B1 * | 8/2003 | Mikurak | 717/174 |
| 6,658,393 B1 * | 12/2003 | Basch et al. | 705/38 |
| 6,795,808 B1 * | 9/2004 | Strubbe et al. | 704/275 |
| 6,898,570 B1 * | 5/2005 | Tedesco et al. | 705/14 |
| 7,076,504 B1 * | 7/2006 | Handel et al. | 707/104.1 |
| 2001/0016833 A1 * | 8/2001 | Everling et al. | |
| 2001/0021912 A1 * | 9/2001 | DeMarcken et al. | 705/5 |
| 2003/0009430 A1 * | 1/2003 | Burkey et al. | 707/1 |

* cited by examiner

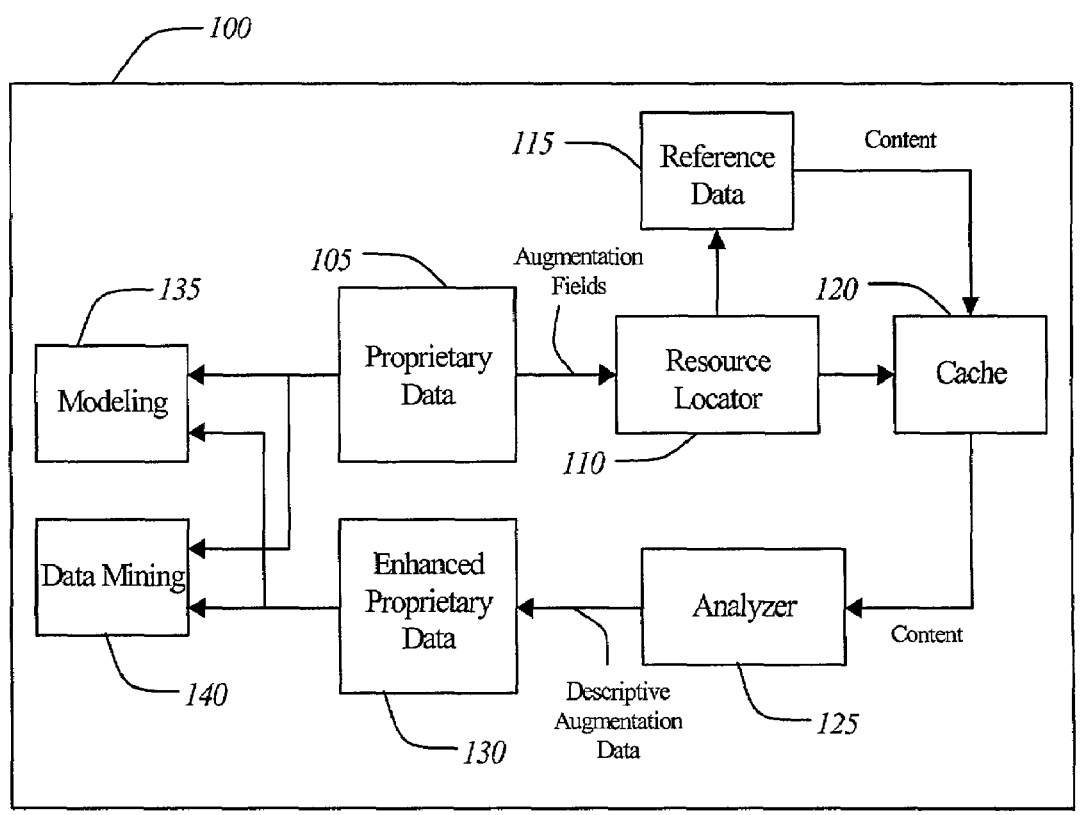
Figure 1 – Main Concept

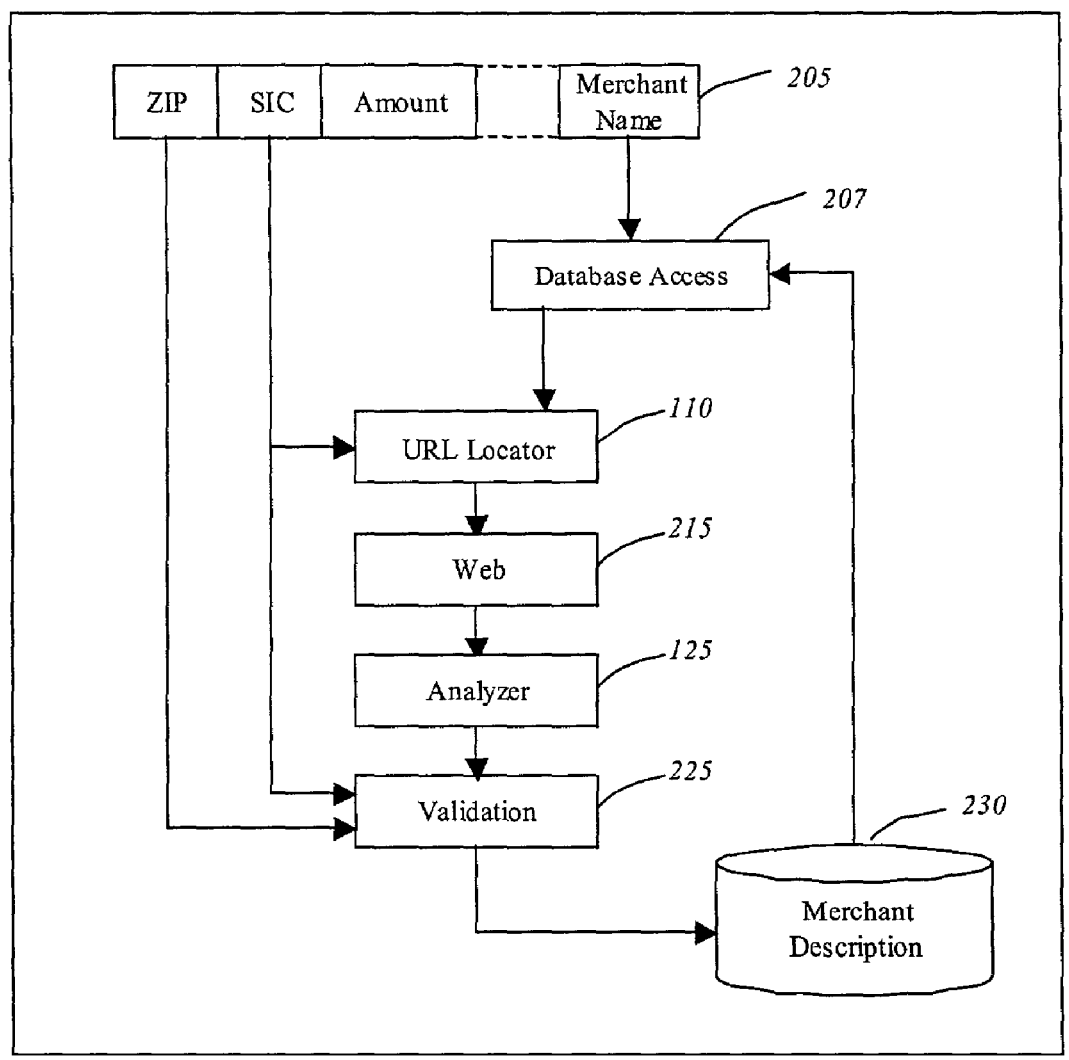
Figure 2 – Credit Card Example

Figure 3 – Web Locator
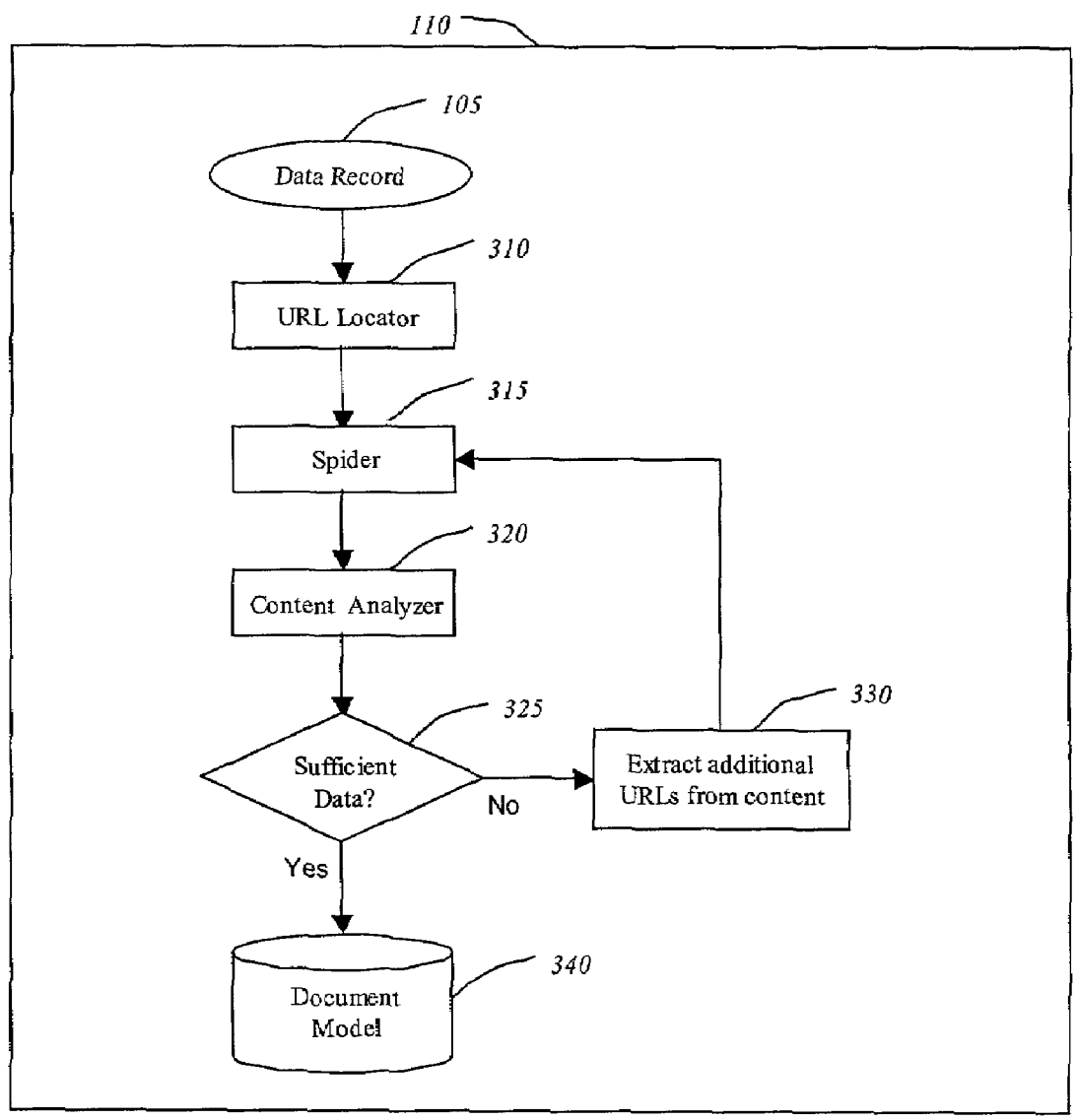

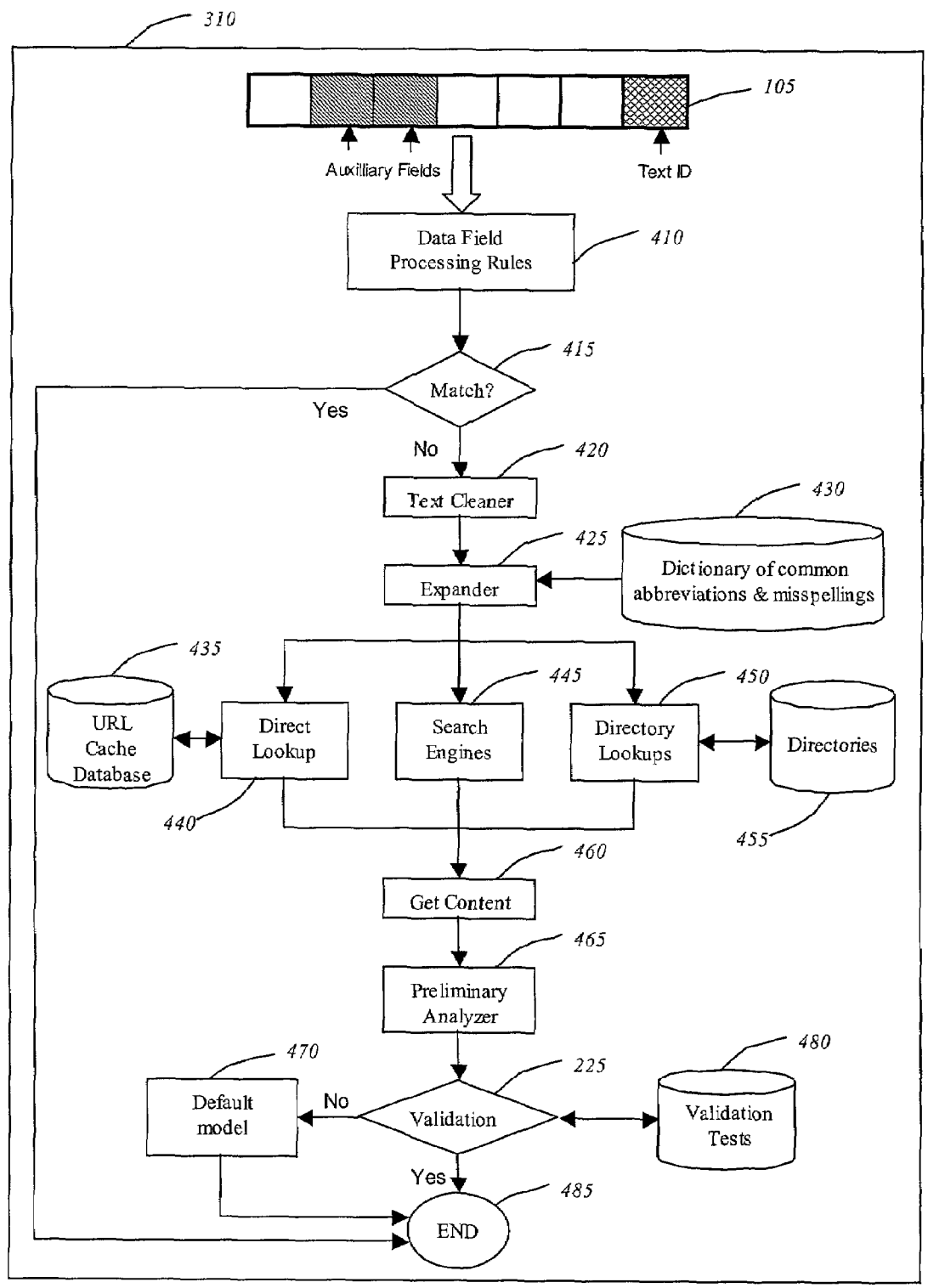
Figure 4 – URL Locator Pipeline

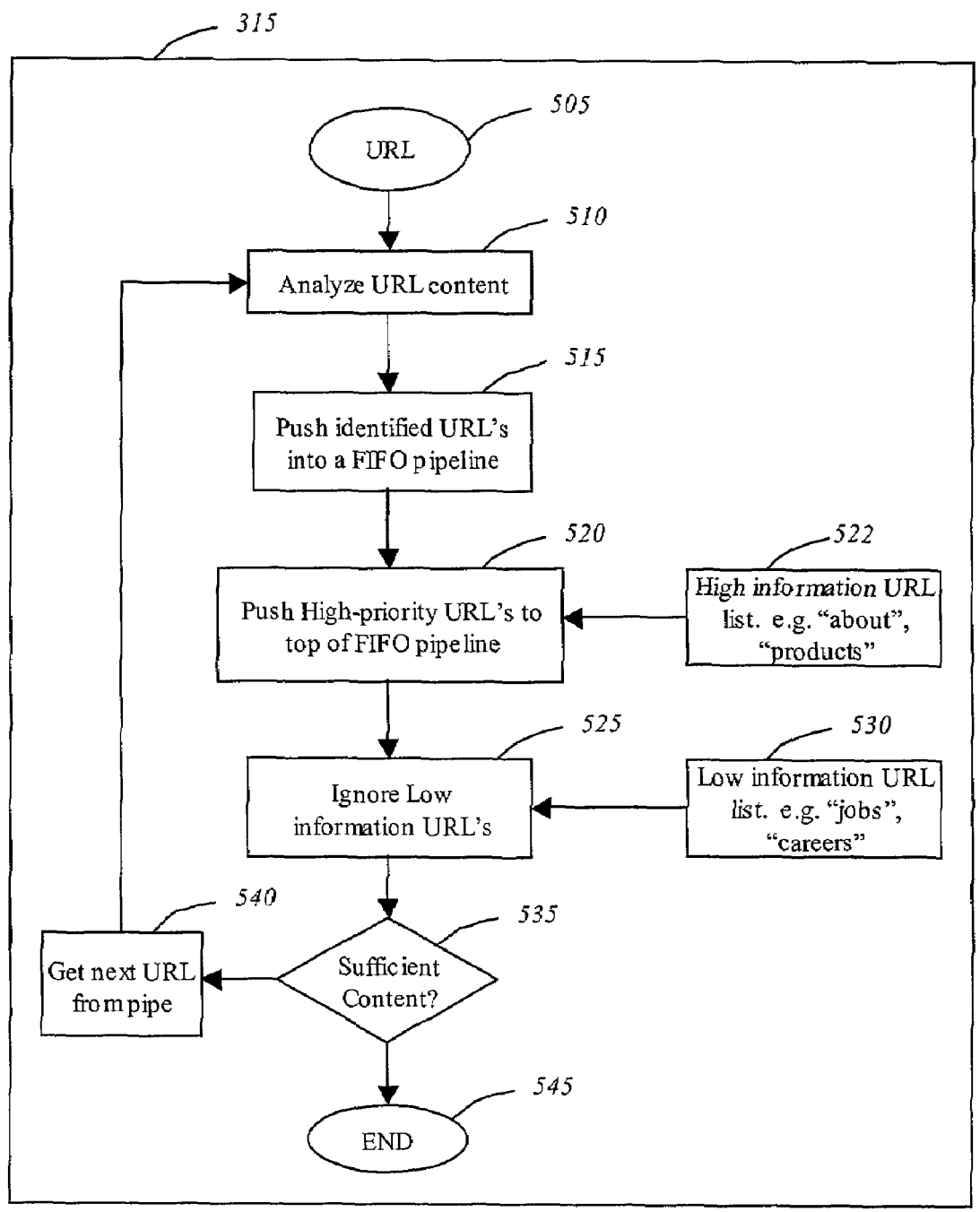
Figure 5 – Spidering Pipeline

Figure 6 – Validation Details
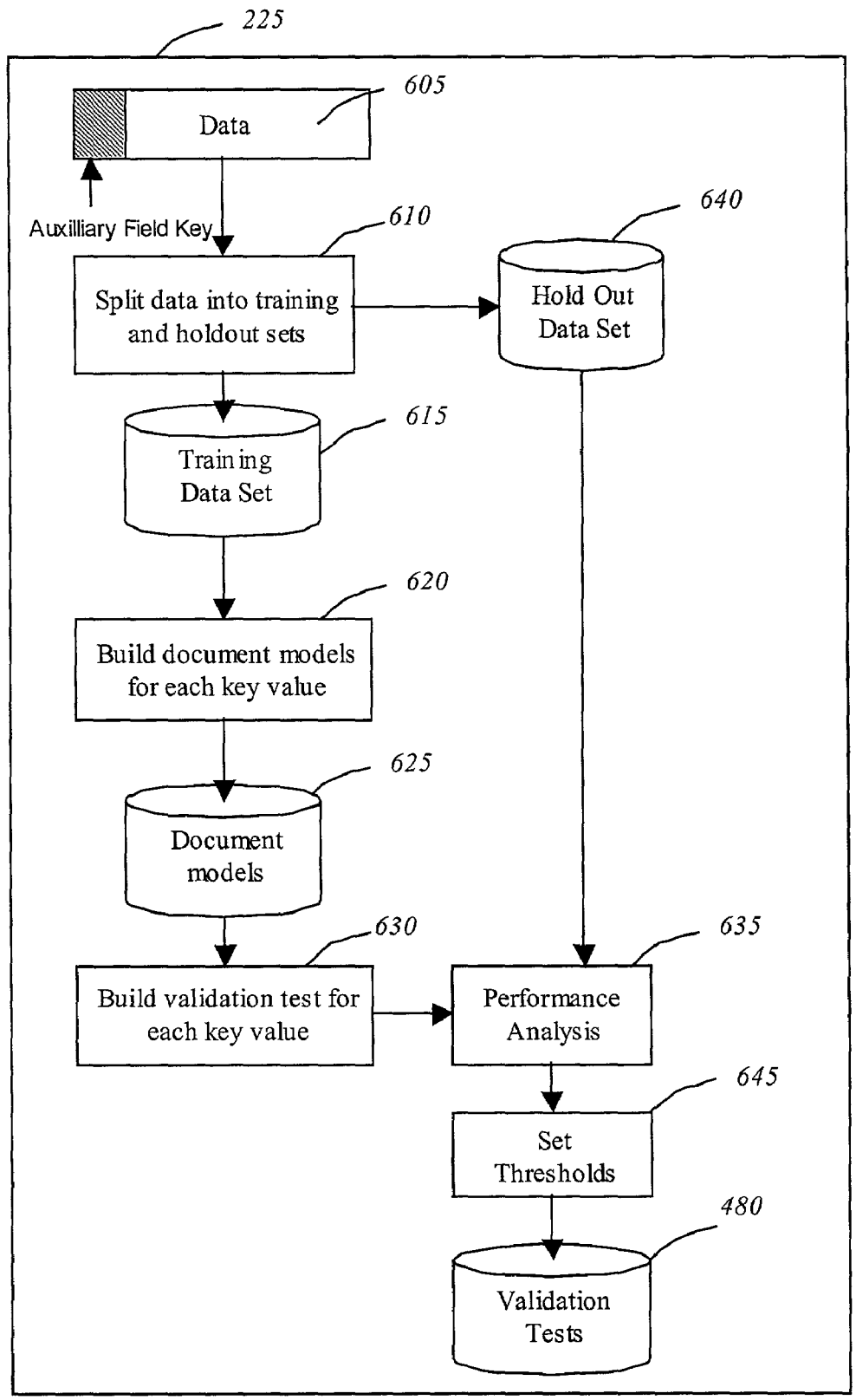

Figure 7 – Analyzer High Level
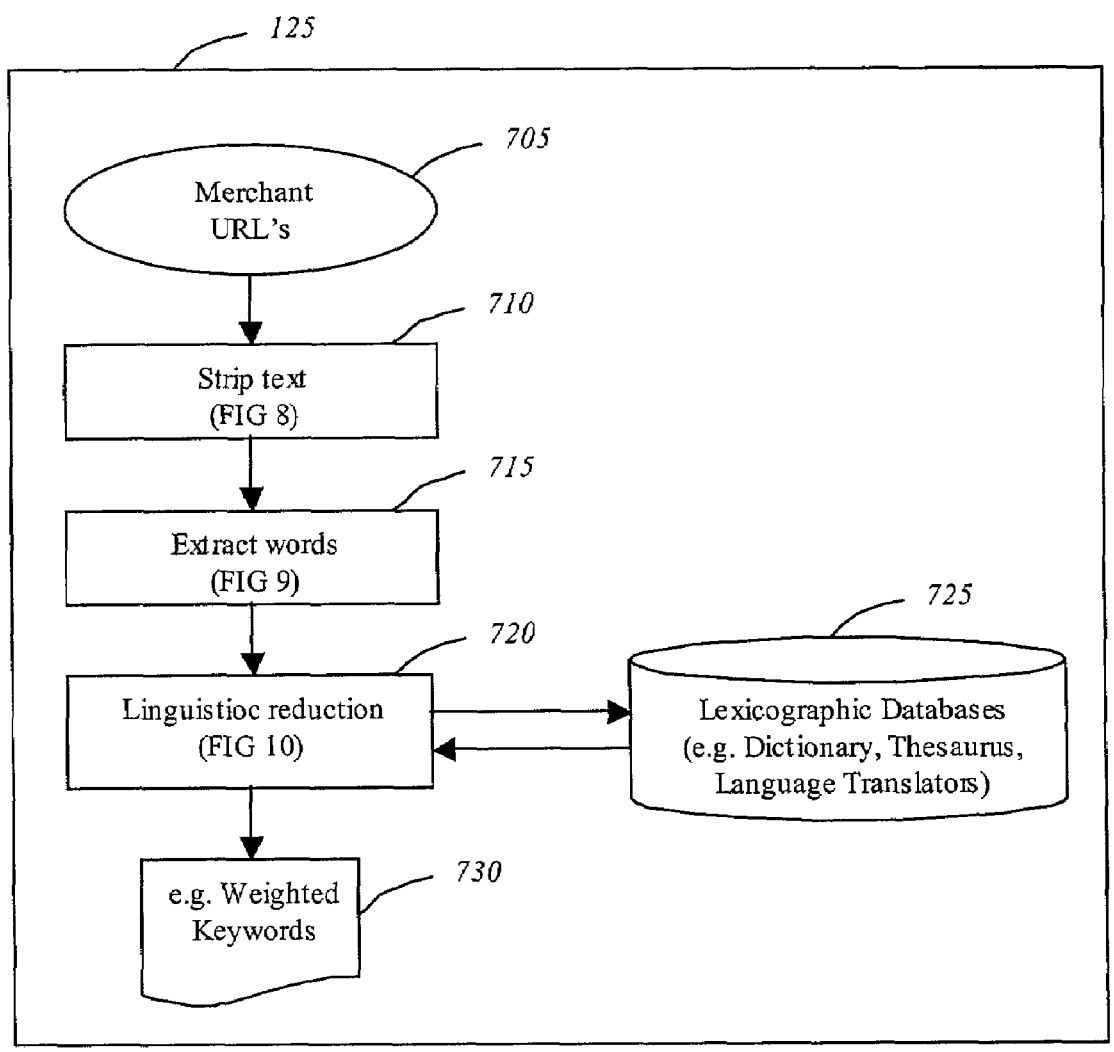

Figure 8 – Strip Text
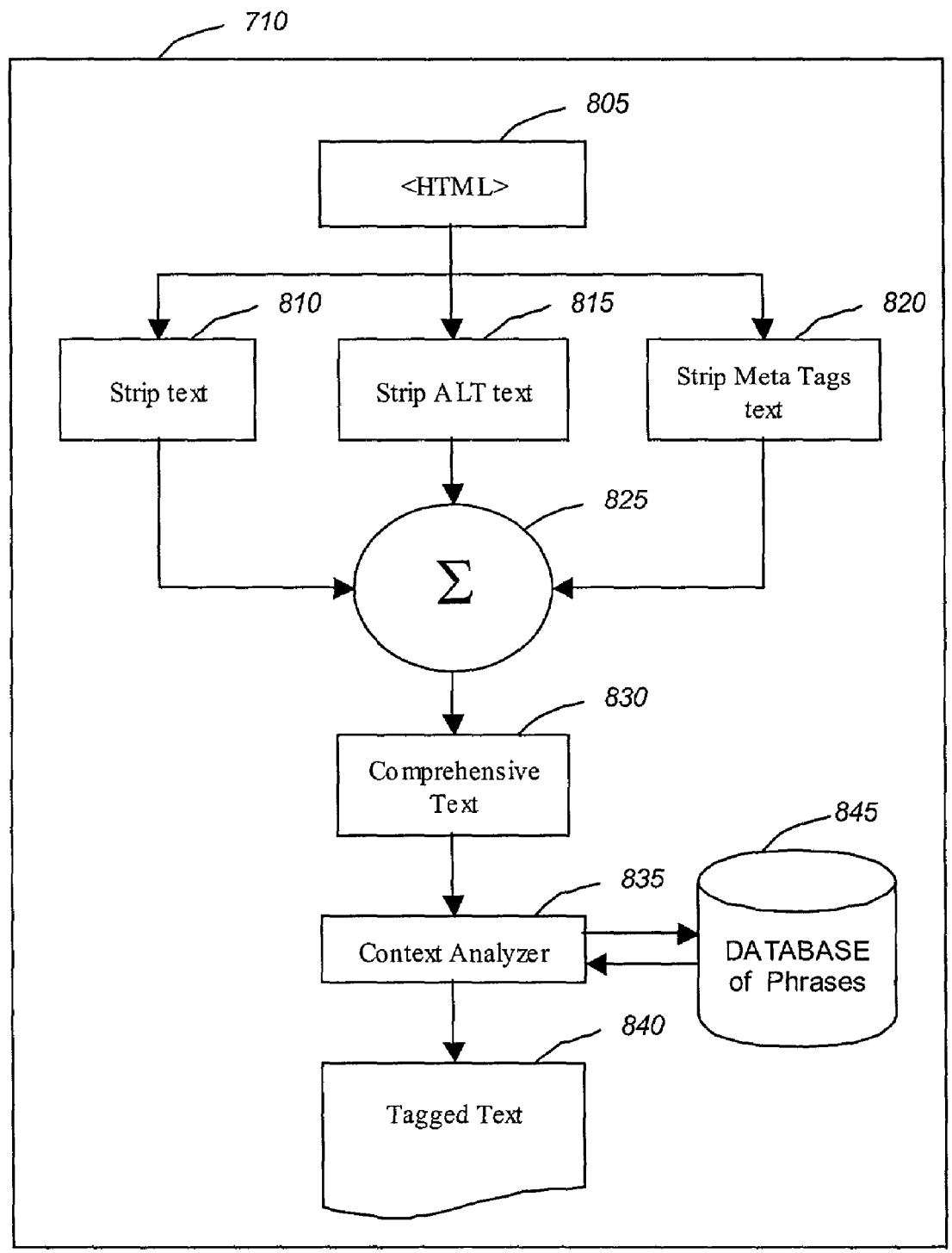

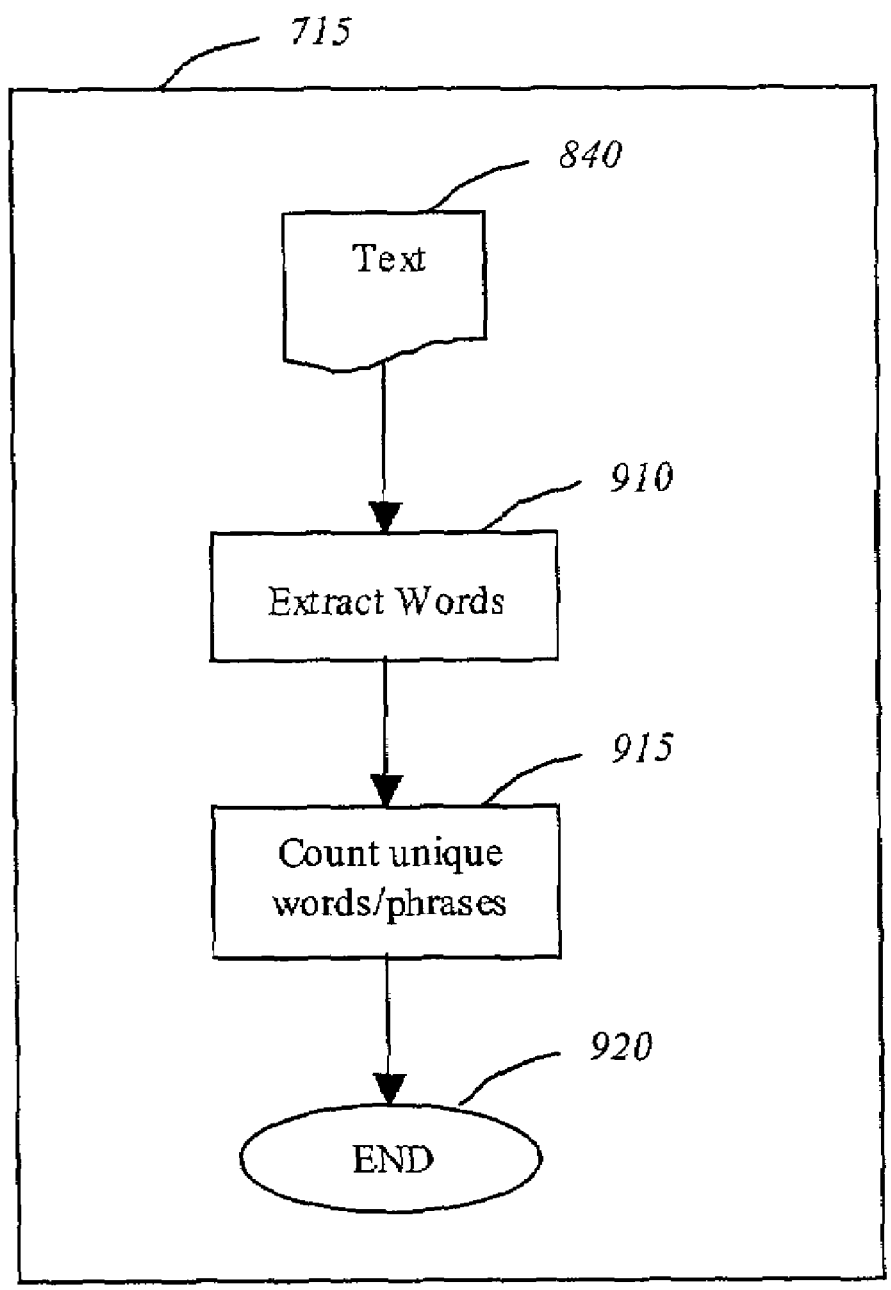
Figure 9 – Extract Words

Figure 10 – Linguistic Reduction
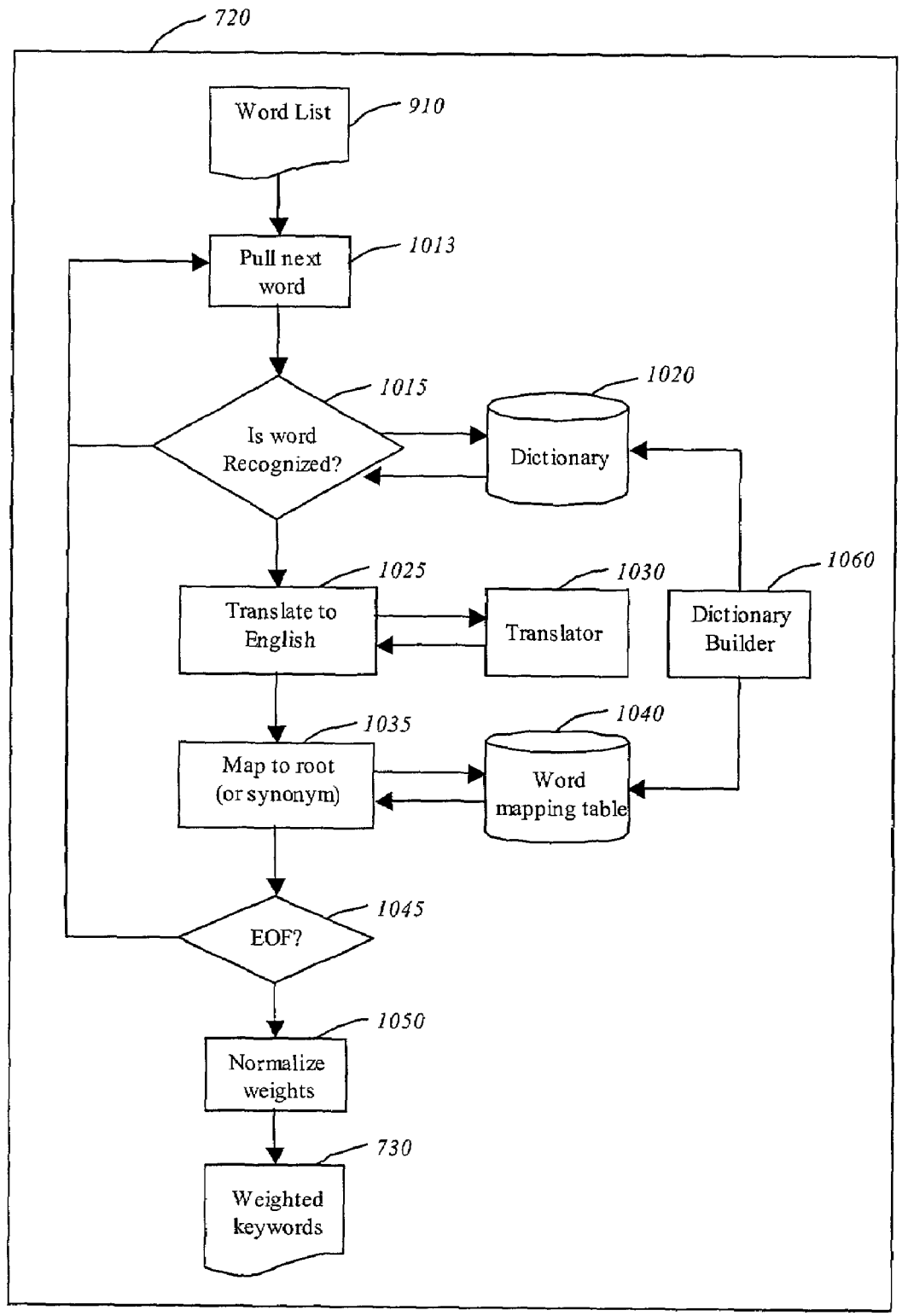

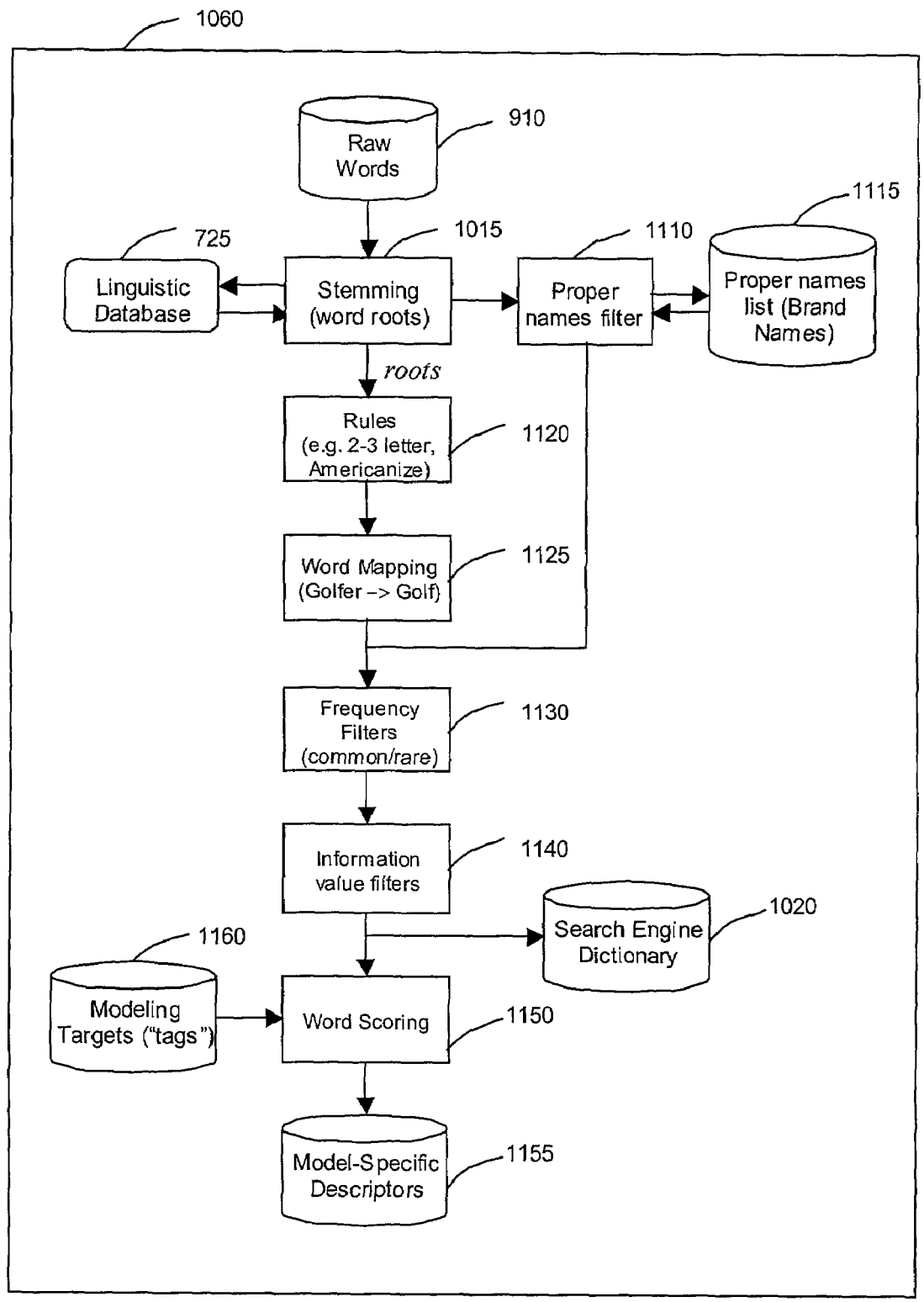
Figure 11 – Dictionary Builder

Figure 12 - Modeling
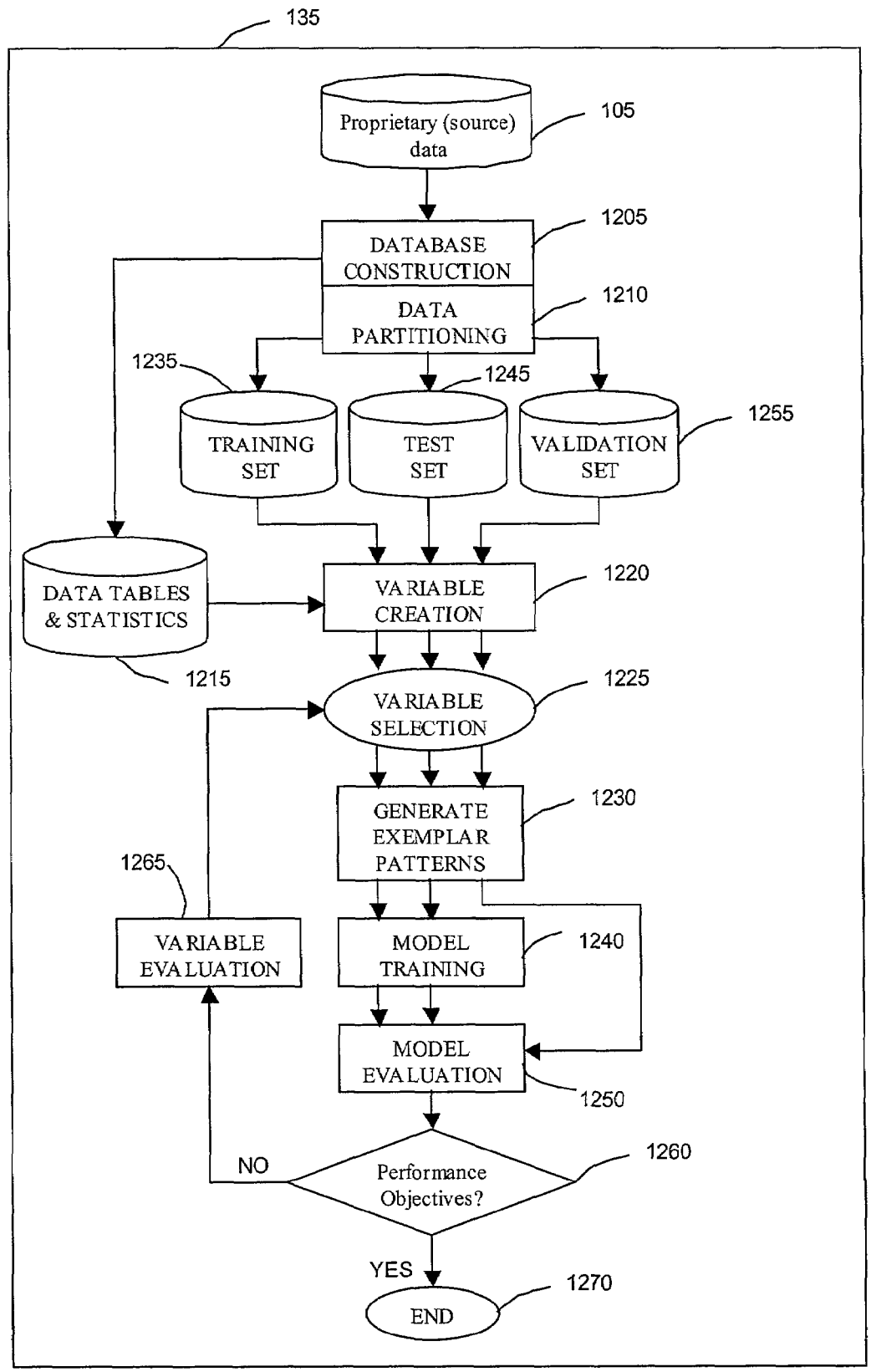

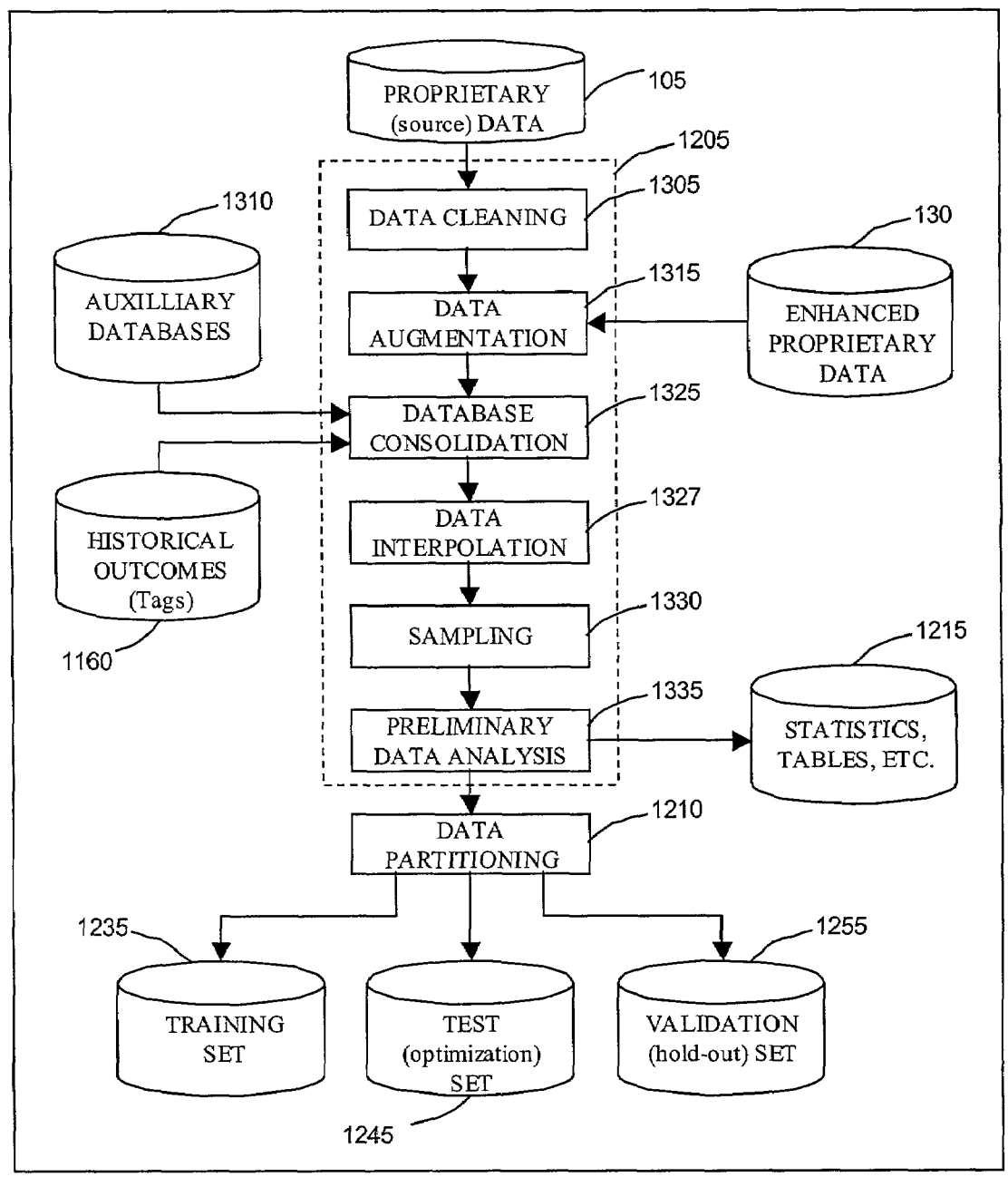
Figure 13 – Modeling Database Construction

Figure 14 – Data Augmentation Example
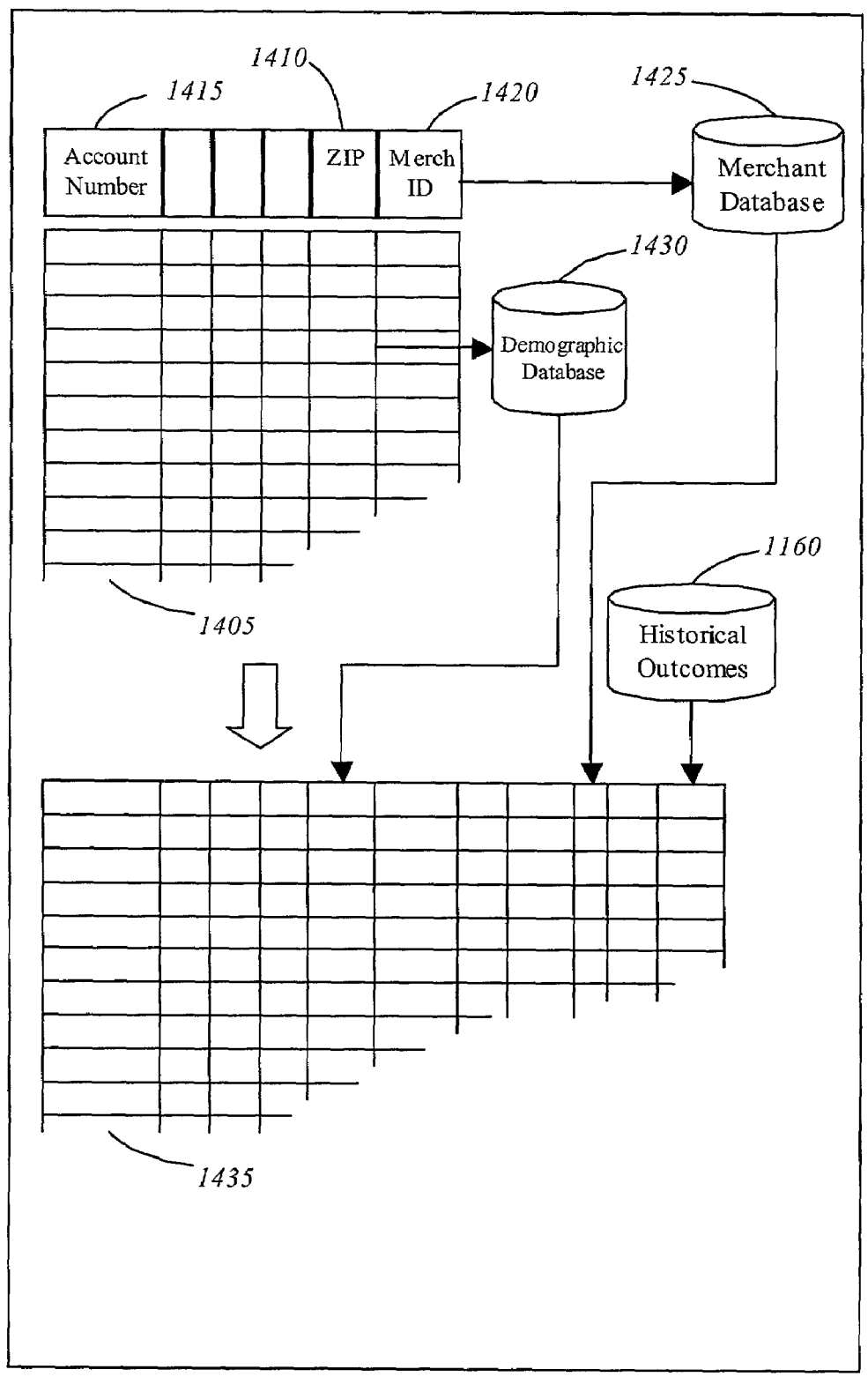

Figure 15 – Model Training
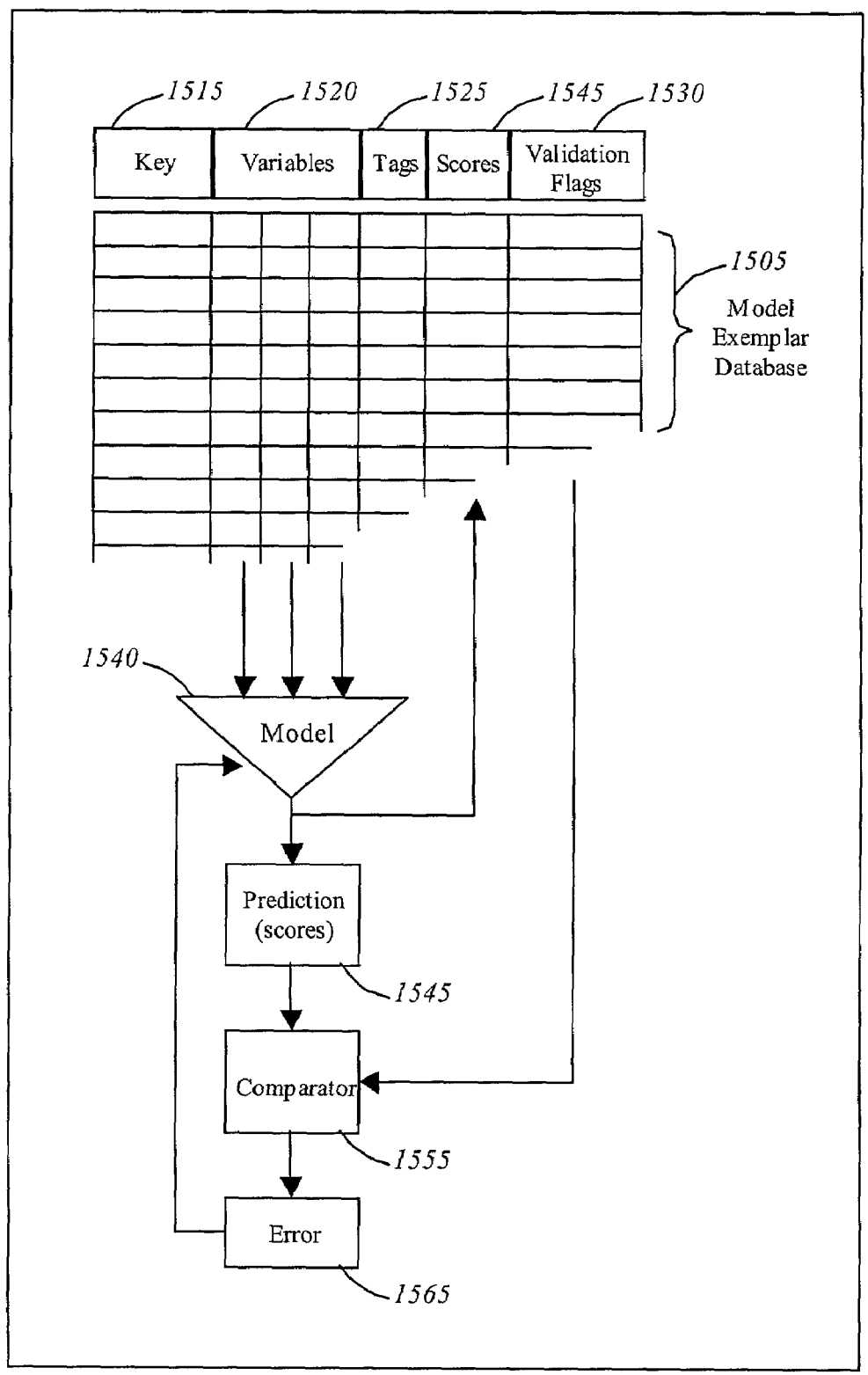

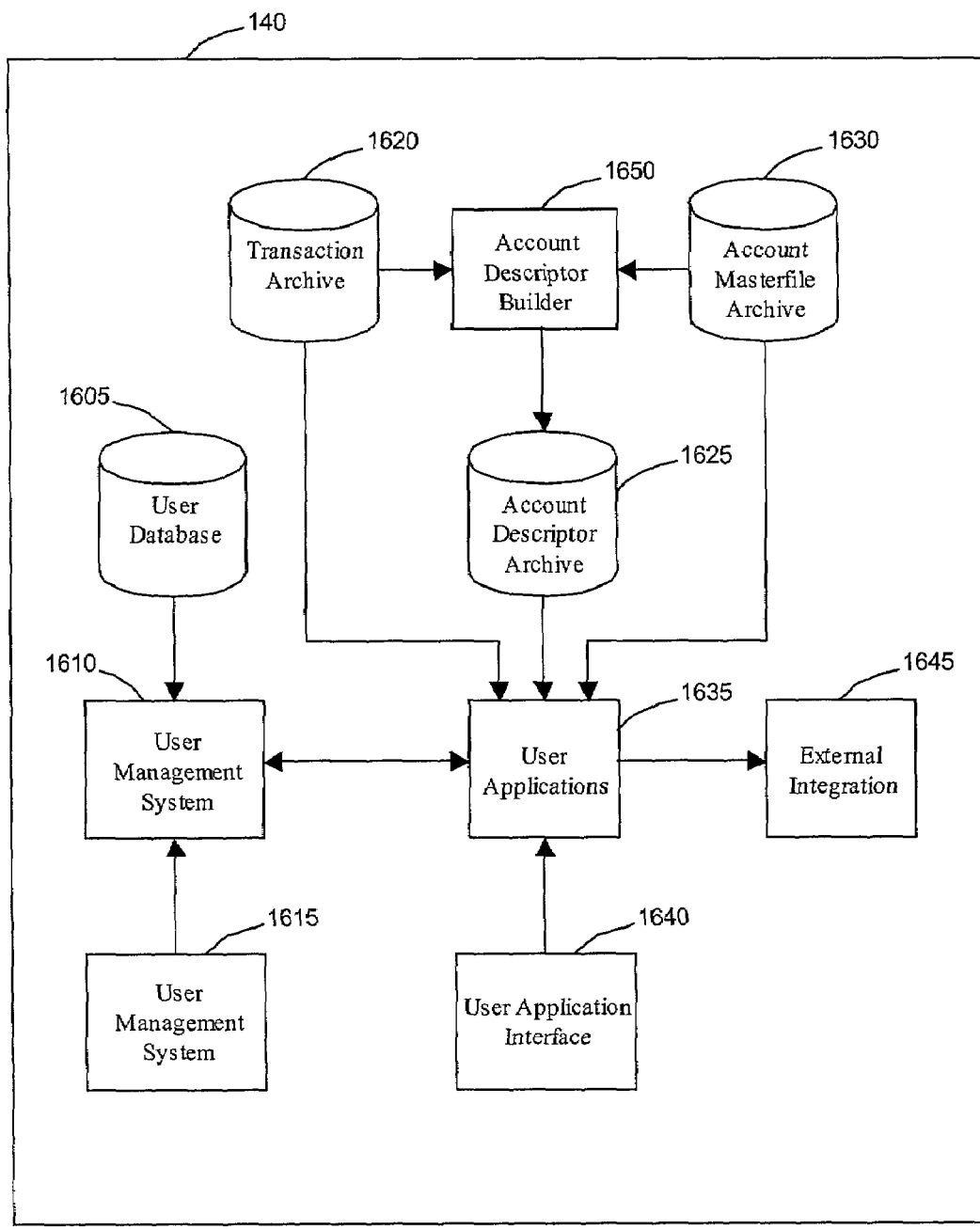
Figure 16 – Data Mining Main

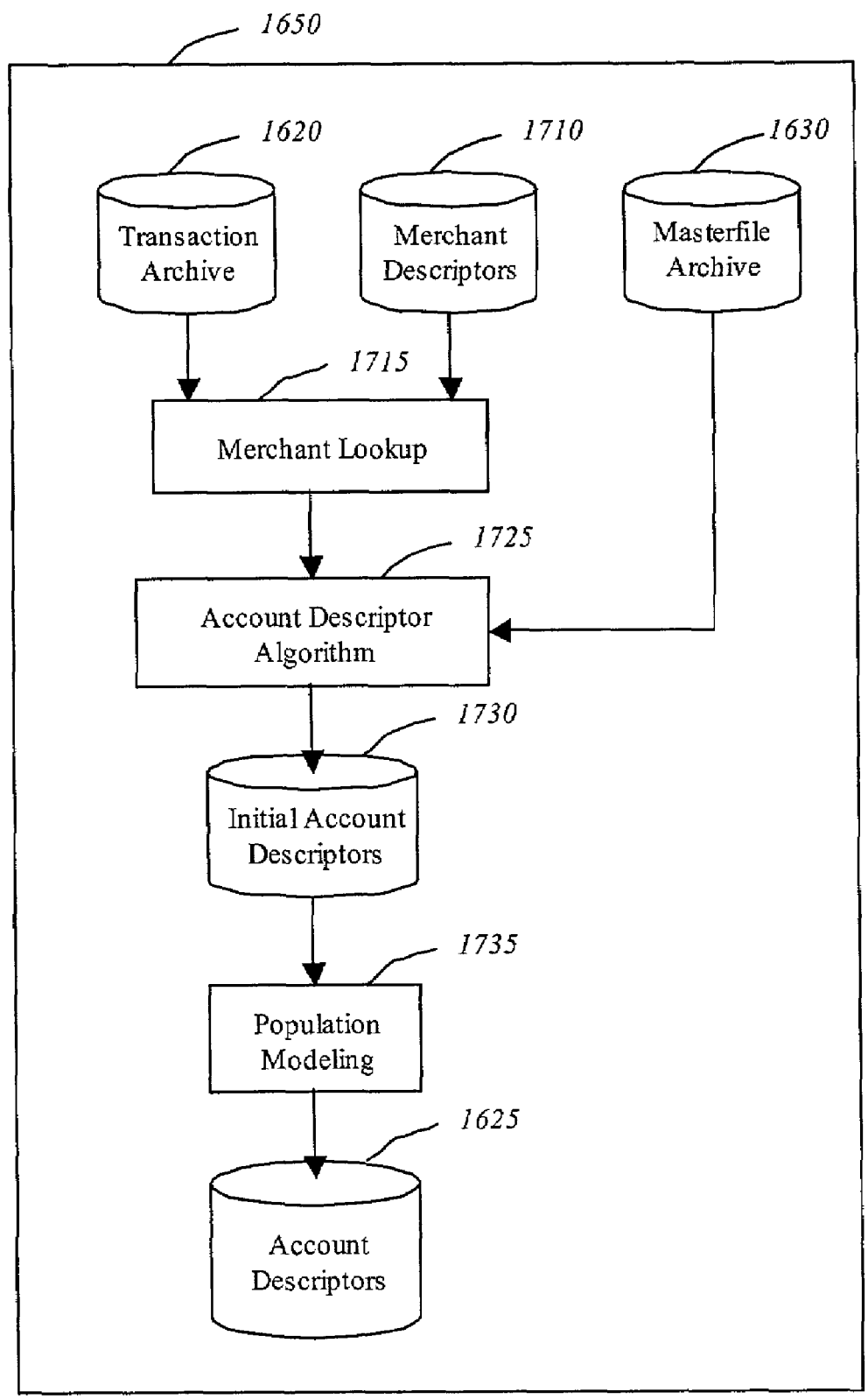
Figure 17 Account Descriptor Builder

Figure 18 – Search Engine
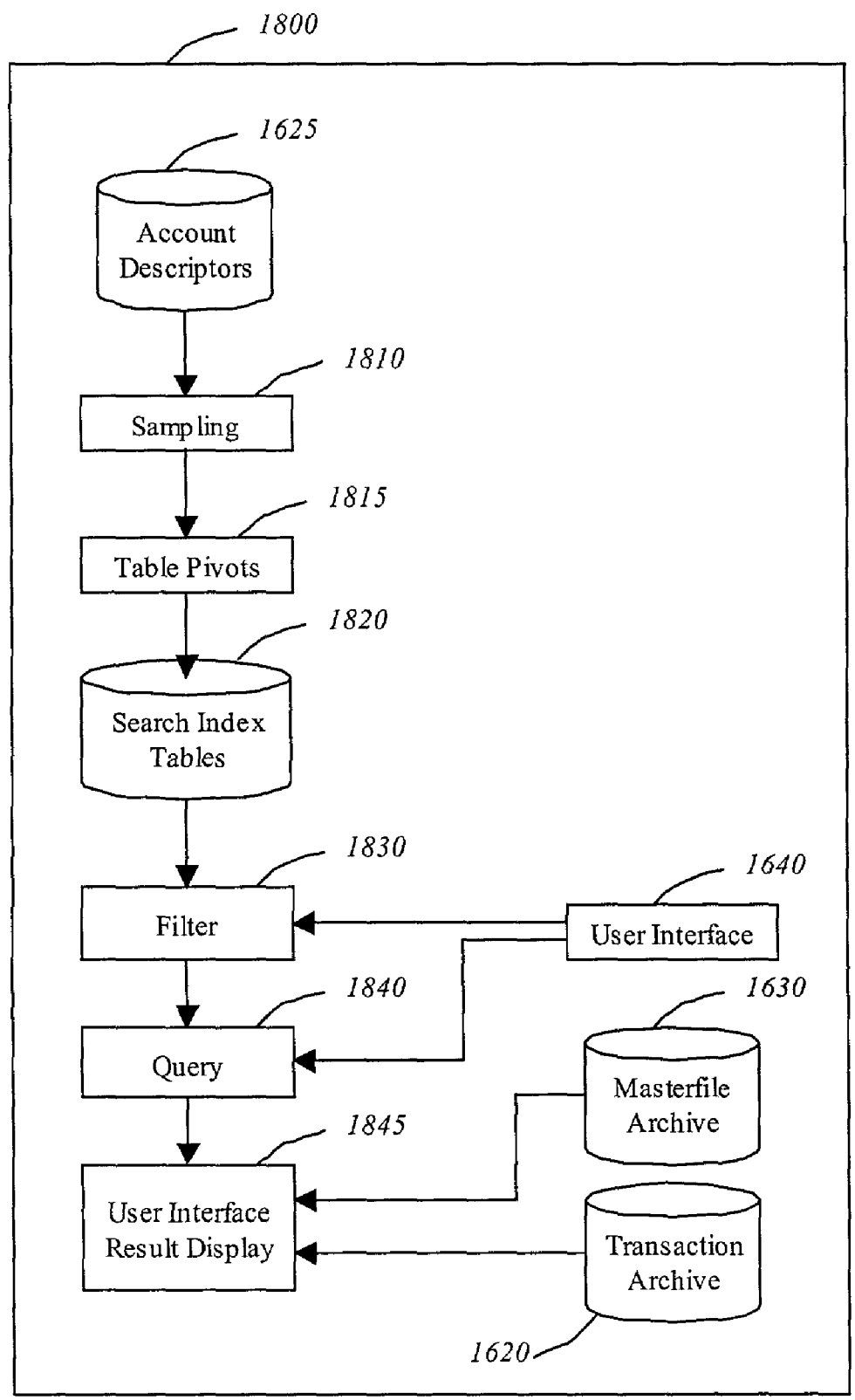

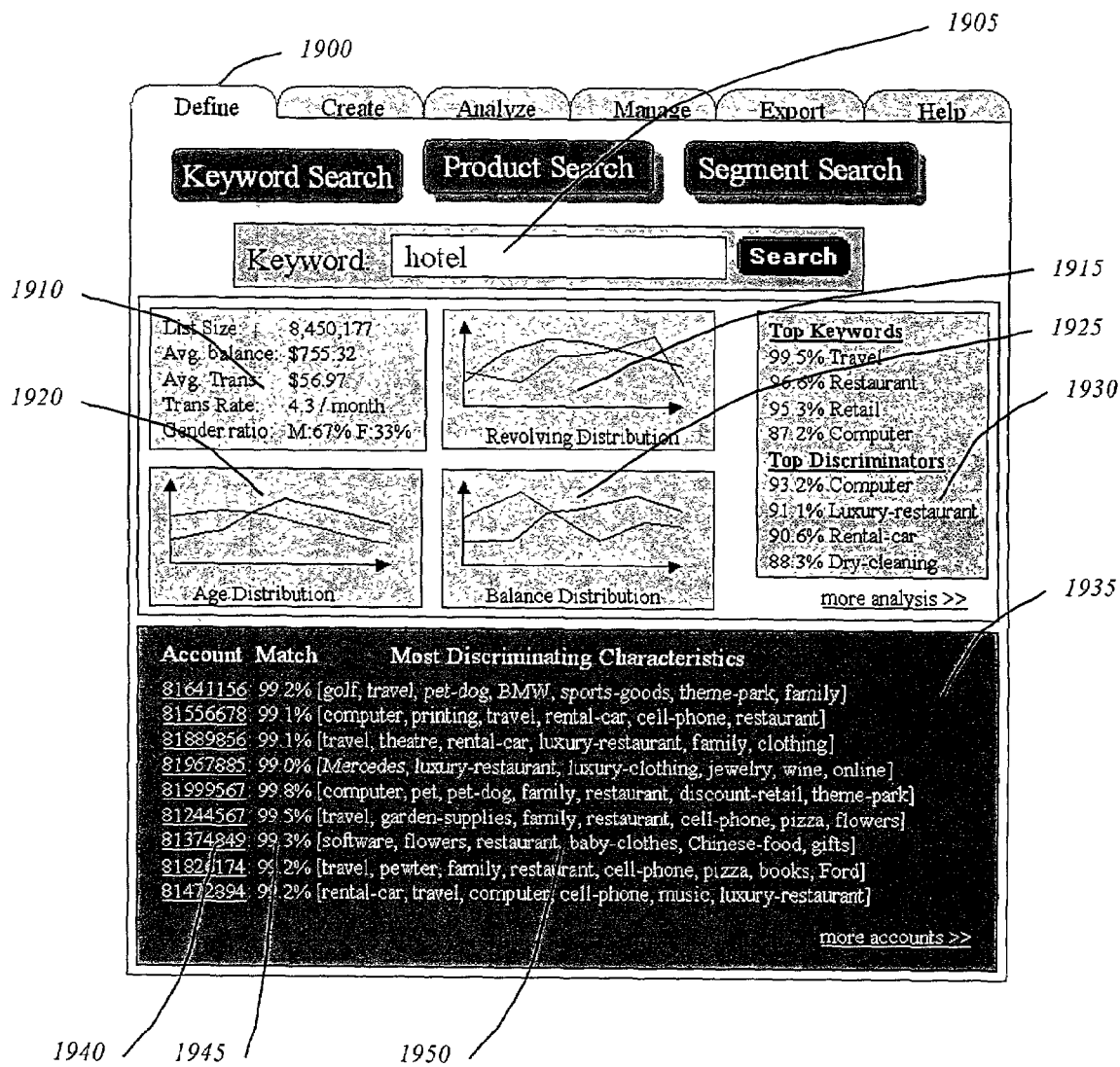
Figure 19 – Search Engine Interface

Figure 20 – Segment Description
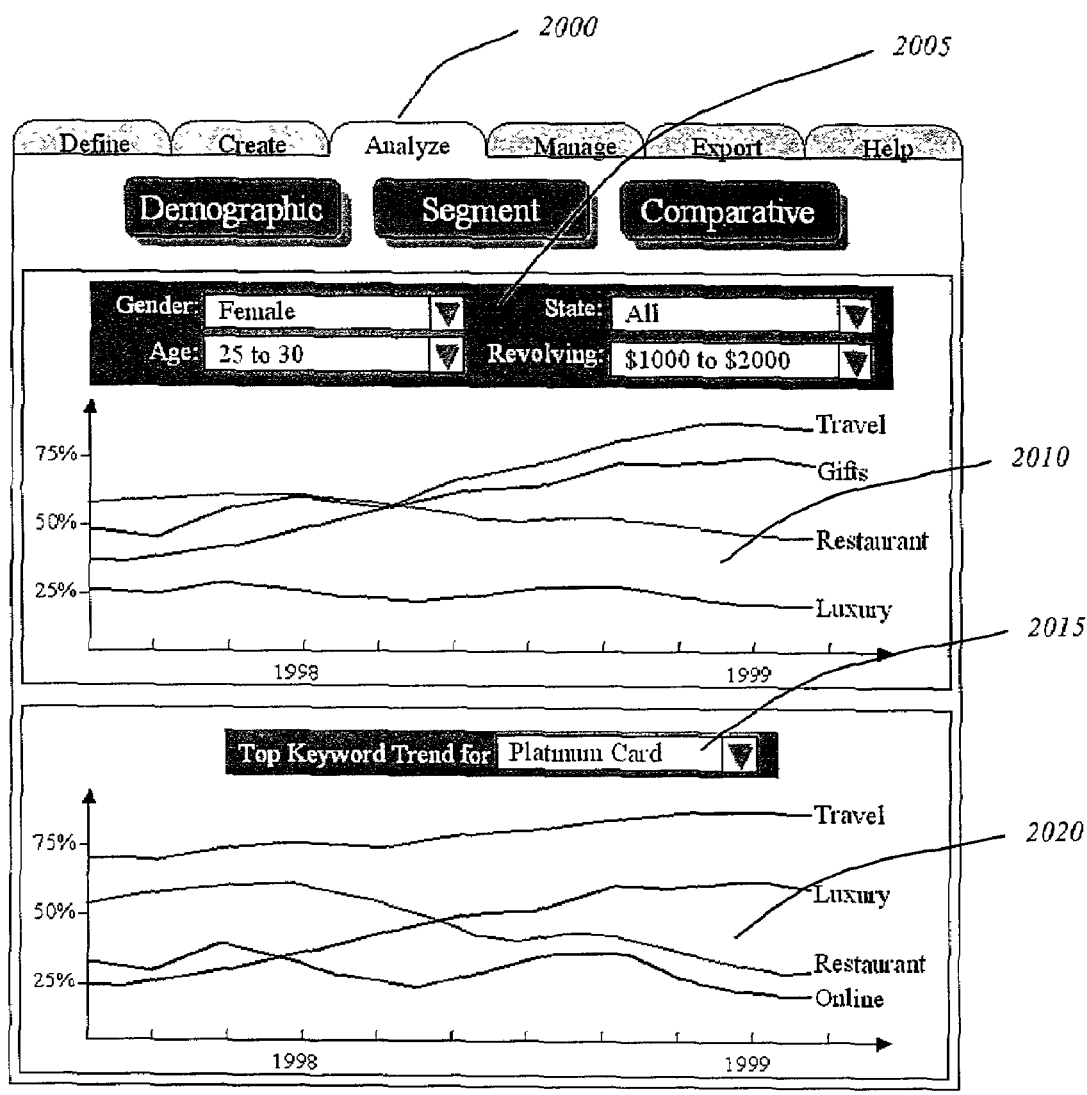

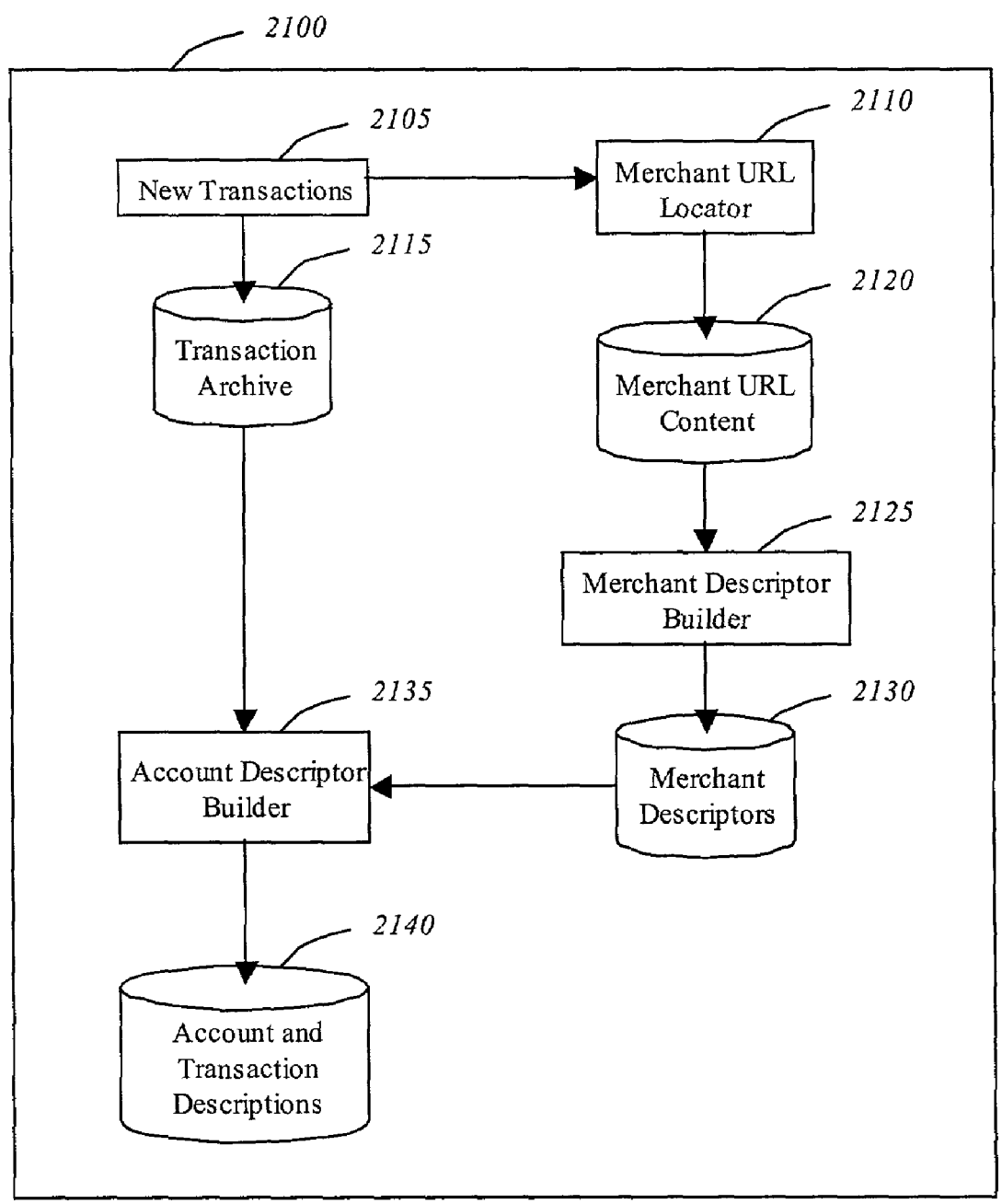
Figure 21 – CC Example

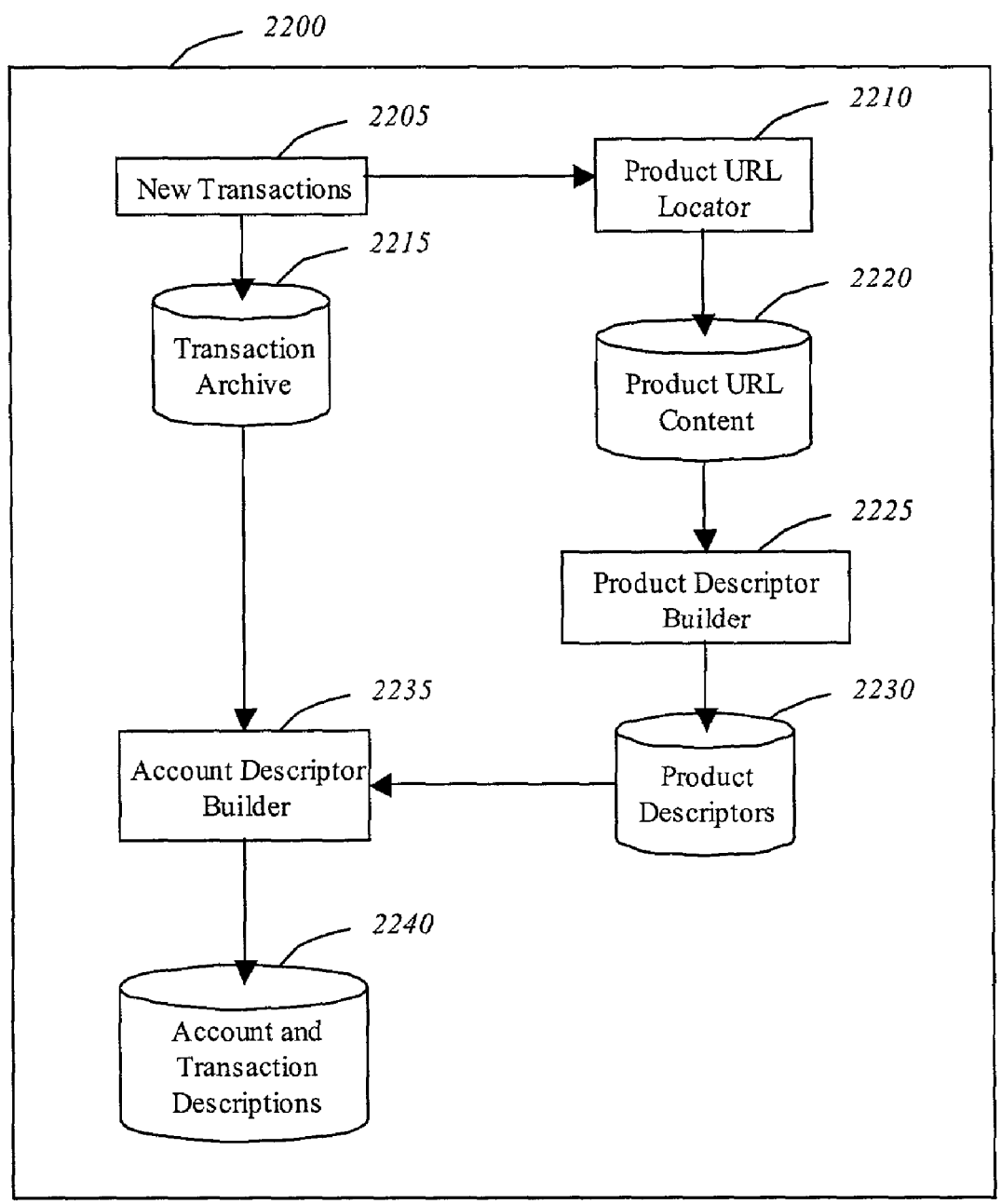
Figure 22 – SKU Example

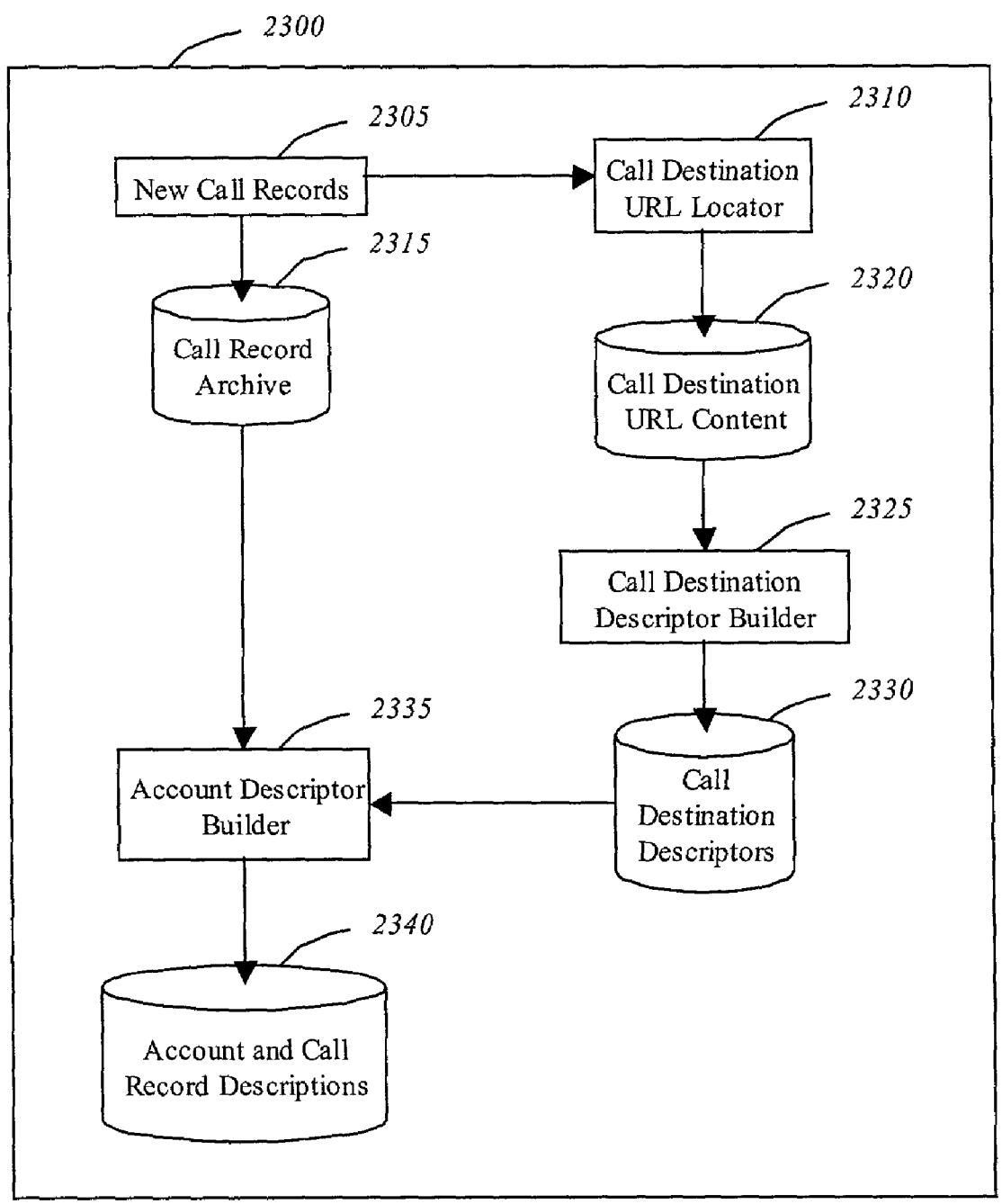
Figure 23 – Telephone Example

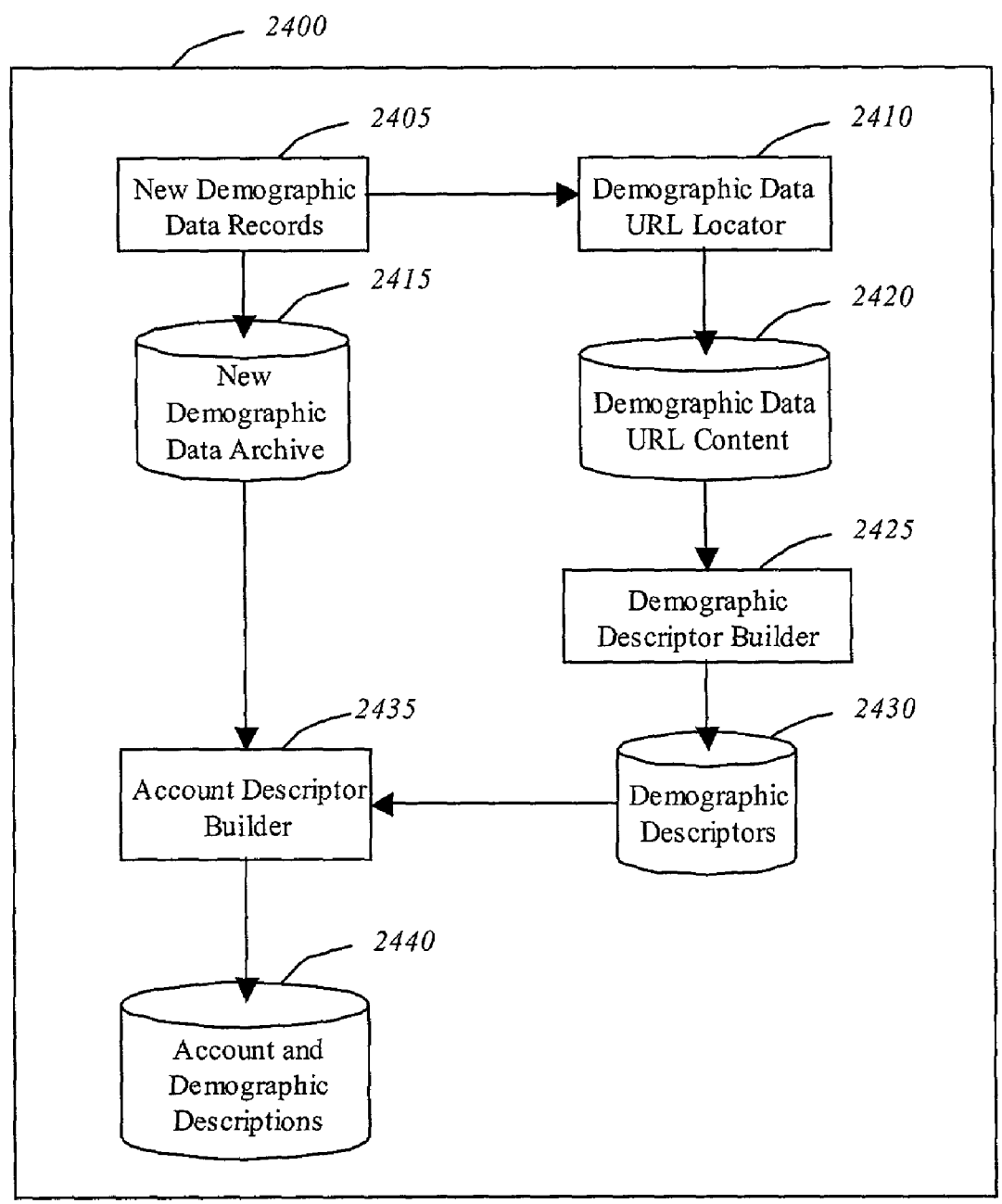
Figure 24 – Demographic Data

Figure 25 – Browser Transactions
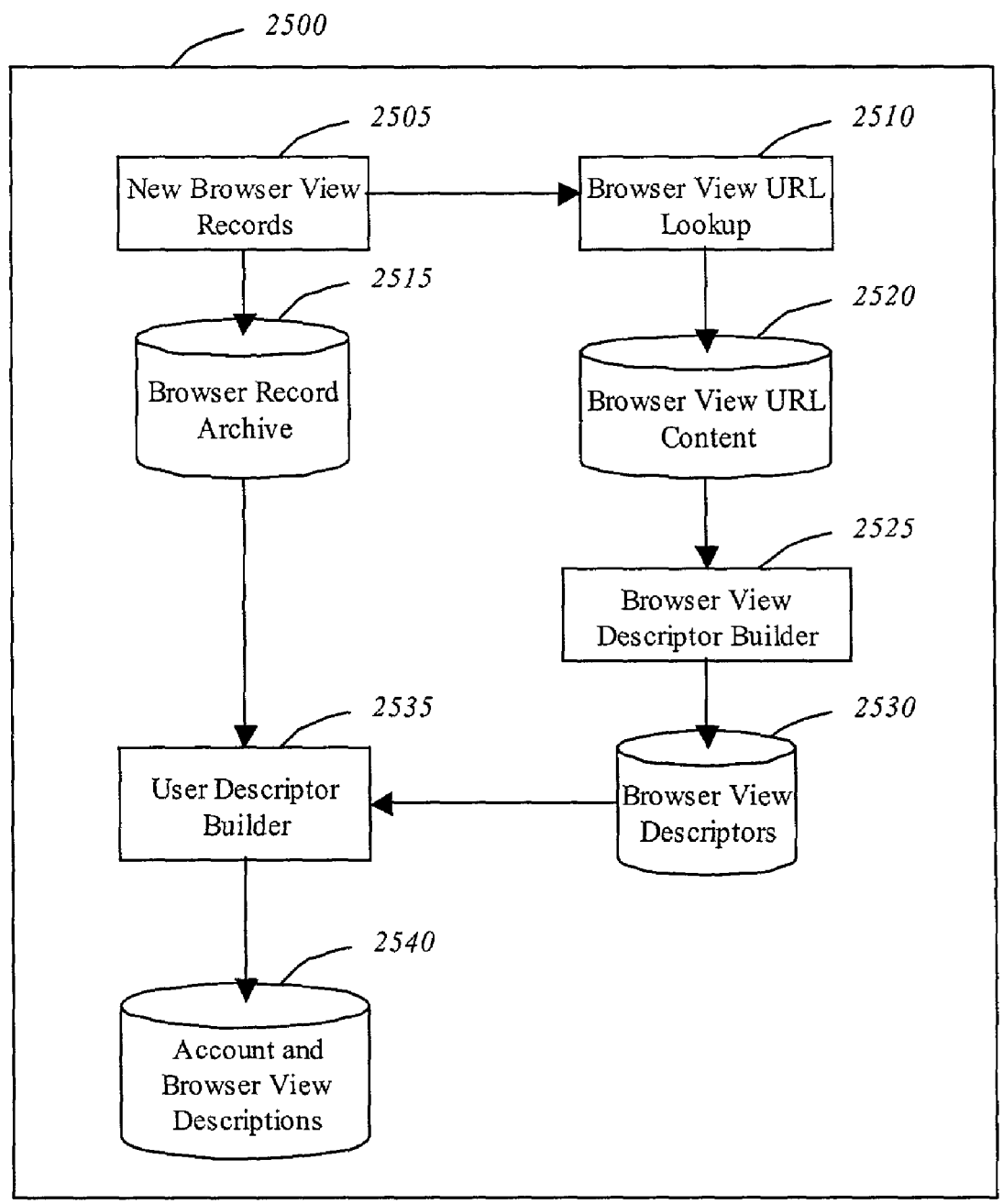

_SYSTEM AND METHOD FOR OBTAINING KEYWORD DESCRIPTIONS OF RECORDS FROM A LARGE DATABASE_

CROSS-REFERENCE TO RELATED PROVISIONAL APPLICATIONS

This application claims the benefit under 35 U.S.C. § 119(e) of commonly assigned and pending U.S. Provisional Application No. 60/258,575, filed Dec. 28, 2000, entitled "System and Method for Obtaining Keyword Descriptions of Records from a Large Data Base", and U.S. Provisional Application No. 60/265,780, filed Feb. 1, 2001, entitled "System and Method for Obtaining Keyword Descriptions of Records from a Large Data Base", both provisional applications hereby incorporated by reference herein in their entirety.

BACKGROUND OF THE INVENTION

1. Field of the Invention

The invention relates to collecting data for model building and more particularly, the invention relates to a system and method for retrieving keyword descriptions of data fields in large databases.

2. Description of Related Art

The widespread availability of the World Wide Web and Internet services have created a unique opportunity to discover a wide array of information about almost every subject. The Internet is the most up-to-date and complete description of the world. If there is something happening, or you are interested in finding a specific piece of information, more and more people are turning intuitively to the Internet. However, information found in the Internet is usually in an unstructured format, making it difficult to utilize the data on a large-scale format. What is needed is a method and system to harness this powerful tool and use it to provide relevant business information. The present invention provides such a method and system.

SUMMARY OF THE INVENTION

The present invention includes a method for using the Internet to obtain information, including, reading a data record stored in a field of data, searching a database for information describing the data record, condensing the information describing the data record into a value description, associating the value description with the data record, and augmenting the field of data with the value description associated with the data.

The present invention also includes a computerized system for augmenting data from a source database with data from a reference database to generate an augmented database that can be used for predictive modeling, including a source database including structured data, a reference database having reference data, a locator component configured to use the structured data to locate reference data in the reference database suitable for association with the source database, an analyzer component configured to process the reference data into a set of descriptors and associating the descriptors to the source data to form an augmented database, a predictive modeling component configured to classify behavior with the augmented database, and a data mining component configured to conduct searches of data in the augmented database.

One aspect of the invention includes a computerized system for augmenting data from a source database with data from a reference database to generate an augmented database that can be used for predictive modeling, comprising a source database comprising structured data, a reference database having reference data, a locator component configured to use the structured data to locate reference data in the reference database suitable for association with the source database, an analyzer component configured to process the reference data into a set of descriptors and associating the descriptors to the source data to form an augmented database, a predictive modeling component configured to classify behavior with the augmented database, and a data mining component configured to conduct searches of data in the augmented database. The source database contains financial transaction data. The source database contains telephone call detail records, and wherein the reference database contains business indices and telephone directories augmented by public information on merchants and service providers. The source database contains investment transactions and the reference database contains public information regarding companies, mutual funds and/or other investment interests. The source database contains insurance transactions, and wherein the reference database contains information regarding insurance products, claims and/or insurance evaluations. The source database contains product inventories, and wherein the reference database contains information describing products. The source database contains Internet browser view transactions, and wherein the reference database contains the Internet pages of the browser view transactions. The source database contains retail transactions at an individual product level, and wherein the reference database contains product information from catalogs. The structured data comprises at least a name or identifier corresponding to a merchant, product and/or service. The reference database contains data in an unstructured format. The reference database is a public database such as the Internet. The locator component locates Electronic pages on the Internet related to the merchant, product and/or service identified in the structured data in the source database. The locator component includes a spider module that searches for embedded links, keywords and/or references in the text found at the located electronic pages. The locator component retrieves the natural language text from the located electronic pages. The processing of reference data in the reference database is accomplished by reducing natural language text to a set of weighted keywords. The locator component validates the located electronic pages using zip code and/or Standard Industry Code (SIC) information stored in the source database. The predictive modeling module uses one or more of the following methodologies: model-based regression, non-parametric regression (e.g., neural networks), Bayesian inference, hidden Markov models, fuzzy logic models, evolutionary models, or decision trees. The source database comprises account based transactional records and the analyzer component aggregates the data from the source database and its associated reference data by reference to an account field. The association of structured data from the reference database is delivered through a predictive statistical model built from known historic outcomes associated with records within the source database.

An additional aspect of the invention includes a computerized system for augmenting data from a source database with data from a reference database to generate a searchable database that can be used for predictive modeling, comprising a source database comprising transaction data records with at least one field identifying a merchant, product and/or service, a merchant identifier database comprising reference addresses and value description identifiers for merchants, products and/or services, an address locating module configured to search a reference database to locate references for merchants, products and/or services identified in the source database, a transaction augmentation module, wherein the value description of a particular merchant, product and/or service is appended to transaction data records and stored in an account description database, and a merchant analysis builder module configured to condense the references provided by the address locating module into a value description and store the value description in the merchant identifier database. This further comprises an account descriptor builder module configured to compile descriptive account records from the merchant identifier database and the source database. This further comprises a lexicographic database configured to index value description identifiers to keywords. The reference database comprises the Internet. This further comprises a predictive modeling module configured to predict future behavior of accounts, merchants, or other entities, using data from the account description database. This further comprises a data mining search engine module configured to conduct keyword searches of the account description database to identify accounts, merchants, or products.

An additional aspect of the invention includes a method of using a computerized system for augmenting data from a source database with data from a reference database to generate a searchable database that can be used for predictive modeling, comprising obtaining at least one data record recording an event from the source database, identifying a field in the data record that identifies an entity, locating reference data from the reference database that describes the entity identified by the identifier data, processing the reference data to form a set of keyword descriptors describing the entity, augmenting the data record with the keyword descriptors to generate an augmented data record describing the entity, building an account descriptor database that includes at least one data record that correlates the at least one event with the description of the entity from the augmented data record and searching the account descriptor database for selected data records that meet a desired criteria. The step of locating reference data further includes locating data in an unstructured database. The reference data is located on the Internet. The reference data is located by determining Electronic pages using the identified field in the data record. Locating the reference data further includes using a spidering module to locate additional Electronic pages embedded in the Electronic pages. The reference data is reduced from natural language text to keyword descriptors. This further comprises validating the located reference data using data from the data record. This further comprises storing the augmented data record in a merchant database.

An additional aspect of the invention includes a method for using unstructured data from a reference database to obtain information used to augment structured data from a source database, comprising reading a data record from the source database, searching the reference database for information describing the data record, condensing the information describing the data record into at least one keyword description, augmenting the data record with the keyword description to form an augmented database. The reference database comprises the Internet. The data record contains at least a merchant name or identifier. Searching the reference database further comprises locating electronic pages related to the merchant identified in the data record. Searching the reference database further comprises obtaining the natural language text found at the located electronic pages. Condensing the information comprises reducing the natural language text to at least one weighted keyword.

An additional aspect of the invention includes a computerized system associating unstructured data from a reference database to augment structured data from a source database, comprising means for reading a data record from the source database, means for searching the reference database for information describing the data record, means for condensing the information describing the data record into at least one keyword description, means for augmenting the data record with the keyword description to form an augmented database. The reference database comprises the Internet. The data record contains at least a merchant name or identifier. Searching the reference database further comprises locating Electronic pages related to the merchant identified in the data record.

An additional aspect of the invention includes a database for use with a database mining search engine conducting searches for behavioral driven characteristics, said database containing keyword descriptors describing a merchant obtained by reducing information about the merchant from a reference database.

A final aspect of the invention includes a method of generating a behavior driven targeted marketing list, comprising obtaining a plurality of financial transaction records between at least one individual and at least one merchant, identifying the merchants involved in the transactions, searching a reference database for information about each of the merchants, condensing the information into a list of weighted keywords that describe each of the merchants, associating the weighted keywords with the transaction records, generating a profile of each of the at least one individuals using the weighted keywords describing the merchants, where the at least one individual performed financial transactions, and searching the individual profiles to identify targeted individuals that exhibit a desired behavioral history.

The details of the embodiments of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 1 is a block diagram illustrating a computer environment for augmenting fields of data from a source database according to one embodiment of the invention.

FIG. 2 is a block diagram of an embodiment of the system shown in FIG. 1 as applied to credit card data.

FIG. 3 is a block diagram of one embodiment of the resource locator of FIG. 1.

FIG. 4 is a block diagram of one embodiment of the url locator of FIG. 3.

FIG. 5 is a block diagram of one embodiment of the spidering module of FIG. 3.

FIG. 6 is a block diagram of one embodiment of the validation module of FIG. 2.

FIG. 7 is a block diagram of one embodiment of the analyzer module of FIG. 1.

FIG. 8 is a block diagram of one embodiment of the strip text module of FIG. 7.

FIG. 9 is a block diagram of one embodiment of the extract words module of FIG. 7.

FIG. 10 is a block diagram of one embodiment of the linguistic reduction module of FIG. 7.

FIG. 11 is a block diagram of one embodiment of the dictionary builder of FIG. 10.

FIG. 12 is a block diagram of one embodiment of the modeling module of FIG. 1.

FIG. 13 is a block diagram of one embodiment of the modeling database construction of FIG. 12.

FIG. 14 is a block diagram of one embodiment of a data augmentation example of an embodiment of the invention of FIG. 1.

FIG. 15 is a block diagram of a model training example using the modeling module of FIG. 12.

FIG. 16 is a block diagram of one embodiment of the data mining module of FIG. 1.

FIG. 17 is a block diagram of one embodiment of the account descriptor builder of FIG. 16.

FIG. 18 is a block diagram of one embodiment of a search engine corresponding to an exemplary user application shown in FIG. 16.

FIG. 19 is an example of a search engine interface of an embodiment of the invention including the search engine of FIG. 18.

FIG. 20 is an example interface of a segment description interface of an embodiment of the invention including the search engine of FIG. 18.

FIG. 21 is a block diagram of a credit card transaction embodiment of the invention of FIG. 1.

FIG. 22 is a block diagram of a product sku embodiment of the invention of FIG. 1.

FIG. 23 is a block diagram of a telephone embodiment of the invention of FIG. 1.

FIG. 24 is a block diagram of a demographic data embodiment of the invention of FIG. 1.

FIG. 25 is a block diagram of a browser transaction embodiment of the invention of FIG. 1.

Like reference numbers and designations in the various drawings indicate like elements.

DETAILED DESCRIPTION OF THE INVENTION

Throughout this description, the embodiments and examples shown should be considered as exemplars, rather than as limitations on the present invention.

The following presents a detailed description of certain specific embodiments of the present invention. However, the invention can be embodied in a multitude of different ways as defined and covered by the accompanying claims. In this description, reference is made to the drawings wherein like parts are designated with like numerals throughout.

Throughout the system description, a distinction is drawn between structured and unstructured databases. In general, structured data refers to data stored in a standard format (such as a fixed-length transaction record). Structured data sets are designed to be read and understood by a computer. Thus, data fields within a record are defined by a pre-defined format and data elements stored within data fields typically can only take on particular values or ranges. Examples of structured data that may be used as source data for this system include financial transaction data, telephone calling or billing records, inventory records, retail transaction records, insurance claims, demographic databases, or stock quotes. Unstructured data, on the other hand, is either (1) designed to be human-readable (such as written documents) or (2) data formatted for a purpose so far removed from those of another database, as to nromally require extensive reformatting or human intervention to translate these data into a useful form. The Internet is a prototypical example of the first type of unstructured database. Unstructured databases often have no standard format, other than file headers (e.g., Web pages) and few pre-defined values (such as text or image entries). Other examples of unstructured data include printed media in electronic form, such as wire-service reports, Gopher articles, publication abstracts, magazine articles, published written works, encyclopedias, and so on. Examples of the second type of unstructured data (data formatted for other purposes) in the context of financial transaction data might include electronic dictionaries, thesaurus, telephone books, business directories or registries.

FIG. 1 illustrates a block diagram of a system that augments fields of data from a source database with information obtained from a reference database according to an embodiment of the invention. A proprietary or source data file 105 containing structured data, is provided to the system 100 by the user. Specific augmentation fields within the source data file 105 are processed by a resource locator 110 and used to locate information describing the proprietary data fields from reference data sources 115, such as world wide web (WWW) sites on the Internet. For the specific embodiment wherein the reference database is the Internet, the resource locator would be a system for identifying Universal Resource Locators (URL's) for web pages, Gopher sites, newsgroups, and the like. WWW sites currently include electronic pages, which are coded in a Hyper-Text Markup Language (HTML) formatting specification. Other formatting specifications, such as Wireless Markup Language (WMP), eXtensible Markup Language (XML), Standard Generalized Markup Language (SGML) and others, are being used as well. Content located by the resource locator 110 may be stored in a memory such as a cache 120. The resource locator 110 may access the data directly in the cache 120 if that data has already been retrieved from the reference data 115.

The content is passed from the cache 120 to the analyzer 125, which reduces the data obtained from the reference data sources 115 to descriptive data. For example, in a merchant description embodiment, the analyzer 125 reduces natural language URL content from a merchant web site to a set of weighted keywords that describe the merchant. The descriptive data derived by the analyzer 125 is then added to the original proprietary data 105 to create an enhanced proprietary data file 130. This enhanced data file 130 may be used in a predictive modeling module 135 and/or a data mining module 140 to extract useful business information. Although content located and analyzed by the system 100 will generally be referred to as text, the invention allows for locating and analyzing other media such as images.

FIG. 2 is a block diagram illustrating one embodiment of the general process of core data augmentation in an embodiment of the system 100 in which the proprietary data files 105 of FIG. 1 includes data relating to a credit card transaction. A transaction record 205 that includes transaction information such as a merchant name, a ZIP code, and a Standard Industry Code (SIC) number is obtained from the source proprietary data file 105 of FIG. 1. The text from the transaction record 205 is passed to a merchant description database access 207, which determines if there is a description of the text in a merchant description database 230. If there is not a description, or if the description is not current, the text is sent to the resource locator 110. The resource locator 110 locates content on Internet web sites 215 describing the merchant identified by the transaction record 205 as will be discussed with reference to FIG. 3 below. The content is extracted from the web sites 215. The content is passed to the analyzer 125, which creates an initial merchant descriptor as will be discussed with reference to FIG. 7 below. A validation module 225 validates the merchant descriptor using the ZIP code and SIC code found in the transaction record 205 to ensure that the correct content has been identified, as will be discussed in more detail with reference to FIG. 6 below. Validated merchant descriptors are stored in the merchant description database 230 for use by the system 100. The merchant descriptors are added to the transaction record 205 to create augmented fields in the enhanced proprietary data 130.

FIG. 3 is one embodiment of a block diagram of the resource locator 110 shown in FIG. 1. The resource locator 110 receives the proprietary data record 105, which contains information about an entity, such as merchant information from a credit card transaction. Specific fields within the data record 105 are used by a Uniform Resource Locator (URL) locator 310 to create a set of possible URLs, or hyperlinks embedded in the data record content, that may contain data describing the entity. The content retrieved from these URLs is then analyzed by a spider module 315 to create a larger set of URLs as will be discussed below with reference to FIG. 5. The content from this larger set of URLs is reduced by a natural language parsing analyzer 320 to produce descriptions of the entity, e.g., merchant, described by the URL. A rules and measures module 325 is used to determine if sufficient data has been located about the entity. Data sufficiency is determined by measuring the total number of keywords and document content against a predefined threshold. If the rules and measures module 325 determines that sufficient data has been collected, a document model 340 is created and is used as the final description for the entity. The document model contains a set of weighted keyword pairs. If there is insufficient data, additional URLs are extracted from the content 330 to recursively spider deeper into the resource content. The additional URLs are extracted from the content pages 330 using a standard HTML parsing tree builder provided within the Perl computer language.

Referring to FIG. 4, operation of the URL locator 310 of FIG. 3 will be described. The data record 105 to be augmented is applied to a data processing module 410. The data processing module 410 applies basic matching rules 415 for particular values of the index fields within the proprietary data record for which there are known URLs or proxy data sources are available. For example, all major airlines have a unique SIC. For instance, American Airlines® has SIC 3001. Records with this code are automatically mapped to the URL "www.aa.com®", which is a URL associated with American Airlines®. Any matches to these rules are then passed through directly to the end of the process 485. The remaining data passes to a text cleaner 420, which removes spurious data, comments, and unrelated data. For certain data field types, an expander module 425 expands abbreviations and truncations of words. For example, the string "PLMB" located in the data record 105 can be mapped to both "PLUMBER" and "PLUMBING". Many possible mappings will be used in subsequent steps. In addition, the expander module 425 corrects common misspellings using a customized spelling dictionary 430 comprising word-based expansion rules.

The final cleaned and corrected text is then passed to a plurality of text to URL transformation modules. Each of these modules uses a different algorithm to attempt to locate a correct URL from the supplied text. The direct lookup module 440 constructs URLs directly from the words contained in the text. The direct lookup module 440 accesses a URL cache database 435 and constructs URLs directly by combining the words contained in the text. A text string might result in multiple URL candidates. For example, "GOTHAM CITY GOLF CLUB" could result in the following existing URLs: "www.gotham.com", "www.gothamcity.gov", "www.citygolf.com", and "www.gothamcitygolf.org".

A search engine algorithm module 445 may use public and/or proprietary Internet search engines to determine appropriate URLs by using words in the text as keywords for searches. A directory lookup algorithm module 450 uses available URL directories to determine appropriate URLs. Public and proprietary directories 455 may be used for such lookups, including Internet white and yellow pages.

The content 460 of the URLs located by the modules 440, 445 and 450 is retrieved and analyzed by a preliminary analyzer 465. The preliminary analyzer 465 uses the validation module 225 to validate the URL content. The validation module 225 uses URL content models or validation tests 480 to determine the validity of the URLs found by the previous algorithms. Details of the processes used to construct the validation tests are given below with reference to FIG. 6. If none of the URLs are validated, a default document model 470 is returned. The default document model is an aggregated weighted keyword set accumulated across multiple documents indexed from a secondary index such as the SIC.

FIG. 5 is a block diagram illustrating one embodiment of the spider module 315 of FIG. 3. The spider module 315 starts with a first URL 505 obtained by the URL locator 310. The URL 505 is analyzed for embedded links 510 found on the URL. The located embedded links 510 are stored in a data structure such as a first-in/first-out (FIFO) stack 515. A high information content module 520 determines if a given URL has high information content. URL links such as "About" and "Products" 522 provide high quality content about the merchant and hence are generally given priority. Other information content measures like number of unique keywords, and size of the file may be used to rank order the URLs for spidering. For example, URLs that contain indicators of specific product information (based on URL, page title and content) are given priority and are put at the front of the FIFO stack 515 so that they will the first URLs to be processed. A low information content module 525 determines if a given URL has low information content. Many URL links like "Jobs" and "Help" 530 provide only generic information, which does not assist in uniquely identifying the merchant. These URLs are given a lower priority, namely, other URLs are processed first or are deleted. For example, URLs that contain information about employment are deleted from the FIFO stack 515. A sufficient content module 535 is used to determine if additional information is required, by measuring total content accumulated per merchant and comparing against a user-specified threshold. If additional information is required, the next URL in the FIFO stack is retrieved 540, and the process is repeated. If the sufficient content module 535 determines that additional information is not required, the module terminates retrieving URLs.

FIG. 6 describes one embodiment of the validation module 225 of FIG. 2. For each value of the validation key, the system creates a probabilistic model of the documents with that key value. The data used to build the model is accumulated prior to model building with each data set 605 consisting of a set of documents all having the same validation key (an example is all web pages for all merchants within each SIC, in which the SIC is the validation key). One model known in the art that can be used is commonly referred to as a Bernoulli document model. Alternative document models can also be used for validation, such as multinomial models. The Bernoulli document model and several standard alternatives are explained more fully in *Data Mining for Hypertext: a Tutorial Survey*, S. Chakrabarti, SIGKDD Explorations, 2000, at 1, which is incorporated herein by reference. A brief explanation of the Bernoulli document module is given below.

A subset of words is selected from a set of words W. This subset of words will usually be substantially smaller than the full dictionary. W is used in creating all the documents models for the various key values.

The training data set 615 is created by applying a random sampling scheme 610 to the data to split it uniformly into the model training set and the hold out data set 640. The hold out data set is used to validate the models produced in this process. The training data set is received by a document builder 620, which uses a given key value k. All the documents are extracted from the training set whose key value is equal to k—defined as set $D_k$. The number of times each word (w) in W 610 is counted. The number of documents in $D_k$ that contain w—is defined as the count $s_{k,w}$. The total number of documents in $D_k$ is defined as N and let $p_{k,w}=p_{k,w}/N$. The value $p_{k,w}$ is the estimated probability that a random document with key value k will contain word w. The values $p_{k,w_1}, p_{k,w_2}, \ldots, p_{k,w_n}$ are the parameters of the Bernoulli model for the set of documents with key value k.

Next, given the parameters of the Bernoulli model for documents with key value k, the likelihood $L_k$ of a document d with respect to this model is computed using equation 1 as follows:

$$L_k(d) = \prod_{w \in W \cap d} p_{k,w} \prod_{w \in W - d} (1 - p_{k,w}) \quad (1)$$

The above formula gives a measurement of how "likely" it is that document d was generated from the same process which produced the documents in $D_k$. The parameters along with the likelihood computation form a Bernoulli document model 625.

A validation test builder 630 uses the created document models 625 for each key value and combines these together to create a validation test 480 for each key value. The basic idea is as follows:

To test if document d is similar to documents in the set $D_{k_0}$ the score for document d with respect to the document model $D_{k_0}$ then needs to be computed. That score is then compared to the scores for document d with respect to all other key values. This comparison could be achieved in several different ways. One approach is based on using Bernoulli Document models and the differences of log-likelihoods, although many alternative methods could be used.

As above, suppose that d is a document, and $D_{k_0}$ is a set of documents. In order to test if document d is similar to the documents in $D_{k_0}$ the likelihood of document d (with respect to the Bernoulli model) is computed for $D_{k_0}$ and the alternative document models $D_k, k \neq k_0$. These likelihoods may be compared using the equation 2 as follows:

$$T_{k_0}(d) = \log(L_{k_0}(d)) - \max_{k \neq k_0} \log(L_k(d)) \quad (2)$$

The idea is that if the document d is similar to the documents in $D_{k_0}$ then $L_{k_0,d}$ will typically be much larger than $L_{k,d}$ for all $k \neq k_0$ and therefore $T_{k_0}$ will tend to be large. On the other hand, if d is not similar to the documents in $D_{k_0}$, then $L_{k_0,d}$ will typically be smaller than $L_{k,d}$ for at least one $k \neq k_0$ and thus $T_k$ will tend to be small.

Once the validation tests have been created for each of the key values, a performance analysis module 635 evaluate their performance and set a acceptance/rejection thresholds 645 (i.e., each test $T_k$ produces a number, we need to determine to proper threshold for to accept or reject the hypothesis that this document is similar to the documents in $D_k$.) Data from a hold out set 640 is used to accomplish this. Data is randomly assigned to either the hold set or the training set using a stratified random sample technique 610. Analysis on the hold out set is used to validate the models developed on the training set. Let $D_k^H = \{d_1, \ldots, d_n\}$ denote to set of all documents in the hold out set with key value k. In order to evaluate the test $T_{k_0}$ we would carryout the following procedure:

For each key value k and each document $d \in D_k^H$ let $t_{k,d}$ denote $T_k(d)$. For each $c \in R$ and key value k compute the proportion of documents $d \in D_k^H$ such that $t_{k,d} > c$, denote this proportion by $p_{c,k}$. Basically $p_{c,k_0}$ is the proportion of documents with key value $k_0$ that would be accepted by $T_{k_0}$ if the cutoff c were used. Ideally we want $p_{c,k_0}$ to be large but $p_{c,k}$ to be small (in some sense) for all $k \neq k_0$. Let $err_c = \max_{k \neq k} p_{c,k}$. In order to choose a cutoff we choose a value of c that gives us a reasonable acceptance rate $p_{c,k_0}$ and a good error rate $err_c$. The error defined above is a worst case error in the sense that we are looking at the maximum false positive rate ($p_{c,k}$ for $k \neq k_0$) against all unwanted key values. There are other measures of error that will fall into this same framework; for example, one could compute the average false-positive rate across all unwanted key values.

The analyzer 125 of FIG. 1 will now be discussed with reference to FIG. 7. The analyzer 125 creates merchant descriptors, for example lists of weighted words, from the content retrieved from merchant URLs. A merchant site is defined by a set of URLs 705 associated with a given merchant or product. The HTML content corresponding to the merchant site is parsed for text content by a strip text module 710, which will be discussed below with reference to FIG. 8. The text content is then parsed to extract unique words and the corresponding word counts by an extract words module 715. Details about the extract words module 715 will be discussed below with reference to FIG. 9. The extracted words are matched against a lexicographic database 725 to map words to their linguistic roots or more common synonyms in a linguistic reduction module 720. The lexicographic database 725 maps words to their natural language root (e.g., running becomes ran). The linguistic reduction module 720 is further explained with reference to FIG. 10. The word counts are updated and each word is assigned a word weight based on the total number of keywords. The analyzer outputs a list of weighted keywords 730.

Referring to FIG. 8, one embodiment of the strip text module 710 of FIG. 7 is described. HTML content 805 from the electronic page or URL 705 is parsed for text. Of course, HTML is but one type of content that could have text stripped. The parsing is conducted in three parallel sub-processes. The first process 810 parses plain text from other HTML fields. It is noted that an HTML page will usually have a header section and a body section. HTML allows the author to create fields called meta tags in the header section, and these fields allow the author to specify information relevant to the web page such as the keywords and the title of the web page. In one embodiment, these tags are given precedence over other tags such that only text associated with specified regions in the document is used. The second process 815 captures the text under the "alt image" tag in HTML. The "alt image tag" is provided to web page designers to add a text comment for images used on the web page. In case the image does not get loaded when the web page is loaded by a browser, the "alt image text" is displayed. This text is usually descriptive of the image and hence is incorporated in the comprehensive text (shown at 830). In the third process 820, the text contained in the keyword meta tags is captured. The text from the three processes 810, 815 and 820 is merged by a compiler 825. The compiler 825 produces a comprehensive text file 830, which includes extracted words in sequence, accompanied by source tags (labels) identifying their text source. A context analyzer 835 also queries a database 845 containing phrases (i.e., word sequences) and word usage rules to tag the text for context (i.e., 'verb', 'adj+noun phrase', etc.). The context analyzer database is a publicly available database called WordNet. This tagged text 840 is then sent to the extract words module 715 for further analysis.

Referring to FIG. 9, one embodiment of the extract words module 715 of FIG. 7 is described. In the extract words module 715, the tagged text 840 of FIG. 8 is parsed for unique words and phrases, which are extracted at into an extracted word list 910.

The phrases are identified using syntactic rules based on English language such as adjective-noun and noun-noun combinations. A parser, which identifies the sentence structure and information within them, returns individual words, word combinations and phrases. At 915, count is made of the words and phrases and word combinations in the word list 910 for frequency, and the word list 910 is passed onto the linguistic reduction module 720 for analysis.

Referring to FIG. 10, one embodiment of the linguistic reduction module 720 of FIG. 7 is described. The linguistic module 720 receives the word list 910 obtained from the extract words module 715. At 1013 a word is pulled from the word list 910. A recognition module 1015 compares the word against a dictionary 1020 created by a dictionary builder module 1060 to validate each word as a recognized root. The dictionary builder module 1060 is further described below with reference to FIG. 11. A translator module 1025 translates each word in the word list 910 to English using a publicly available translator 1030. A mapping module 1035 maps the word list 910 to appropriate roots using a word mapping table 1040 which is part of the publicly available WordNet database. This is done for all words and the counts, for each of the words mapped to a root, are added to the count field for the root. The counts as determined at 915 of the top 'n' keywords, where 'n' is the number of keywords required in the merchant descriptors, are normalized such that the weights sum to unity 1050 and the normalized weighted list of keywords 730 is passed on to form the final merchant descriptor.

FIG. 11 illustrates the dictionary builder module 1060 of FIG. 10. The dictionary builder module 1060 builds a map that reduces raw words to their roots. At 1015, a recognition module matches words from the word list 910 against the lexicographic database 725 and stems the words into root. The roots are then passed to a series of heuristic rules filters 1120, which include dropping all two/three letter words and "Americanizing" the spellings. A word mapper 1125 reduces related words to a single root, such as "running" to "run" and "golfers" to "golf". Frequency filters 1130 discard the frequent or rare words using manually selected frequency thresholds. The roots are also passed to a proper names filter 1110 that generates a list of proper names by querying a brand names database 1115. The proper names list is then integrated with the list of words passing the frequency filter 1110. Information value filters 1140 discard words that score low on a word scoring metric. One word information metric is based on computing the variance of the frequency of the occurrence of the word across accounts. A word is considered more informative the greater its variability. The output of the filters 1140 is then stored in the dictionary 1020. In the situation where document model specific words are required, modeling targets 1160 are used to measure individual word scoring strength 1150. For example, words can be scored and selected based on how predictive they are of a binary response outcome. This is achieved using a variance or information measure against the two-class binary targets 1160. The highest strength words are then stored in the model-specific descriptor dictionary 1155.

FIG. 12 illustrates an embodiment of the modeling module 135. The proprietary data 105 is processed by a database construction module 1205, which prepares the data for modeling. Database construction involves several sub-processes that will be detailed below with reference to FIG. 13, including data cleaning, data augmentation, consolidation with other databases, interpolation (if necessary) between mismatched datasets, and data record sampling. The resulting dataset is referred to as a consolidated (or enhanced) dataset. During database construction, summary statistics and reference tables 1215 are generated for later use in a variable creation module 1220.

FIG. 13 illustrates details of the database construction module 1205. The source data 105 is examined by a series of data integrity checks. A cleaning module 1305 'cleans' the data using a variety of methods, such as eliminating the entire record, setting missing values to the population mean, inferring their values using evidence from other fields, or setting far out-of-range values to pre-defined minimum or maximum values.

Specific data fields are then used to retrieve records from the enhanced proprietary data 130, consisting of weighted descriptors and natural language descriptions of the corresponding entities. The data records of the source database are then augmented with these auxiliary records to create an augmented database 1315. The data augmentation process is schematically illustrated below with reference to FIG. 14. The database is then consolidated with historical outcome tags 1160, and auxiliary databases 1310 (such as data available from third-party demographic data vendors and census aggregators) creating a consolidated database 1325.

In some cases, the consolidated database covers different sampling intervals (e.g., an account demographic file may be only subject to monthly updates, while a transaction database is updated with each transaction). In such cases, a data interpolation module 1327 calculates or estimates intermediate values for the less frequently-sampled database.

A dataset sampling module 1330 is sometimes required for modeling studies designed to detect rare events. In the case of response-based marketing modeling, the typical response rate is low (under 3%) making such events rare from a statistical modeling viewpoint. In such cases, the rare events are left unsampled, but common events (the non-responders) are sampled down until an 'effective' ratio of cases are created. This ratio is highly dependent on the modeling methodology used (e.g. decision trees, versus neural networks).

At 1335, preliminary analysis may be conducted on the resulting database. Preliminary analysis involves generating statistics (i.e., mean, standard deviations, minimum/maximum, missing value counts, etc.) on some or all data fields. Correlation analysis between fields (especially between any field value and the target values) is conducted to estimate the relative value of various data fields in predicting these targets. The results of these analyses are stored in tables 1215 for later use in variable creation, transformations, and evaluations.

Referring back to FIG. 12, the enhanced data set generated by the database construction module 1205 is randomly partitioned into three data sets by a data-partitioning module 1210. The three data sets, a training data set 1235, a test data set 1245, and a validation dataset 1255 are used in different stages of the model building process 1200. Partitioning data into training and validation sets is a desirable precaution for any type of statistical modeling. The validation set (sometimes referred to as the "hold out" sample) is used evaluate model predictions on unknown observations (data that the model has never "seen"). The "test" (or optimization) data set 1245 is used in some modeling techniques for use in model optimization.

The three data sets 1235, 1245 and 1255 are passed on to a variable creation module 1220. The enhanced data set generated by the database construction module 1205 may consist of account records, in some cases representing transaction activity on an account over many years. Each transaction record, in turn, is comprised of several numerical, categorical, or text fields (collectively referred to as 'raw' data). The variable creation module 1220 transforms these raw data fields into a mathematical representation of the data, so that mathematical modeling and optimization methods can be applied to generate predictions about account or transaction behavior. The complete mathematical representation is referred to as a 'pattern', while individual elements within a pattern are referred to as 'variables'.

The variable creation process 1220 uses several techniques to transform raw data. Examples of data transformation techniques and specific variables are listed below for illustrative purposes with additional examples of variables given in Table 1.

1. Numerical Transformations: Raw data already in numerical form (such as transaction amounts) may be used directly as variables themselves. Numerical or categorical data referencing time (such as dates) are simply transformed into a standard unit of time (e.g., 'days since Jan. 1, 1999' or 'seconds since account open date'). In addition, numerical data fields can be transformed into other useful quantities. An example of a numerical transformation would be to map the quantity to it's 'natural' distribution (for example, transaction amounts are often distributed log-normally, implying a 'useful' variable would be log (TRXN_AMOUNT)). Other mathematical operations include (but are by no means limited to) Z-scaling (measuring the deviation of a quantity from population averages), Fourier analysis (frequency transform of a sequential signal), principle component analysis (PCA), independent component analysis (ICA), binning (transforming continuous quantity into a discrete variables). In many cases, several variables may be created from a single 'raw' data field.

2. Categorical data transformations: Binary, categorical data fields (e.g., marital status[M,S], gender[M/F], etc.) can simply be transformed binary, logical data values ([0,1] or [−1,1]). Higher-dimensional, categorical variables can be transformed in multiple ways. For example, ZIP code fields can be used to index probability or affinity tables 1215 (generated by the database construction module 1205 shown in FIG. 13). ZIP codes can also be transformed into a two-dimensional geographical location. Distances between ZIP codes of two entities (account member's home and merchant location) can then be calculated. Furthermore, distances between transactions, combined with time between transactions, can be used to calculate physical velocity. Additionally, geographical footprints can be calculated for entities with multiple locations (such as franchise retailers).

3. Variables or functions of many variables or data fields: Individual data fields and/or variables can be combined with other data fields to exploit higher-order interactions. For example, transactions at a gas station SIC code or co-occurring with keywords 'gas', 'oil' and 'convenience' would normally suggest a gasoline purchase, with larger transaction amounts implying the customer owns a larger car or truck; however, high transaction amounts may also imply auto repair service. When appropriate, specific variables are designed to capture such non-linear relationships between several data fields. Such a variable would likely benefit a model designed to detect customers interested in a new car loan. For a second example, assume the model objective were to identify people interest in golf. A variable designed to count the number of instances of the keyword, 'GOLF' in a customer's transaction history is an obvious candidate variable. However, some merchants, such as hotels, often include references to local golf courses on their web pages. The augmented data record at such merchants might consequently include the descriptor 'GOLF' for any customer staying at the hotel. A simple adjustment to this variable, then, would be to discount instances of 'GOLF' derived from transactions at hotel SIC codes or when accompanied by hotel-related keywords.

4. Temporal data: Raw account data consist of sequences of transactions over time. Several classes of variables are constructed to exploit this sequence. Variables designed to capture the temporal nature include summary variables (i.e., moving averages), rate estimation variables (i.e., using Kalman filtering techniques), periodicity or recurrent event detection (i.e., variables designed to detect the most frequently called telephone numbers, regular grocery stores, and periodic payments). Signal processing techniques can be used to develop custom temporal filters. Hidden Markov models can also be used to update behavioral state transitions with each transaction.

TABLE 1

| Model Variable Examples: |
|---|
| 1. Customer/Account demographics variables |
|    Customer Age |
|    Customer since date |
|    Gender |
|    Credit score (from auxiliary model) |
|    Profitability score (from auxiliary model) |
|    Available credit |
|    Probability tables based on geography (2-3 digit ZIP codes) |
|    Household income |
|    Marital status |
|    Number of children |
|    Number and types of linked accounts (credit card, mortgage, insurance, brokerage, etc.) |
|    Estimated net worth |
| 2. Transaction variables |
|    Ave spending/month |
|    Ave number of transactions/month |
|    Rate of change of spending rate (first derivative) |

TABLE 1-continued

Model Variable Examples:

Rate of change of transaction frequency
(first derivative)
Ratio of spending on "preferences/luxuries"
-vs- "necessities" (e.g., "percent of total
spent on groceries, fuel, & utilities")
Frequency of "Card Not Present" (CNP)
transactions (mail-order, automated billing,
Internet, pre-approved drafts, etc.). This is
an indicator of customer acceptance of non-
traditional sales channels.
Frequency of chargebacks (buyer's remorse
detection)
Average distance between account owner's home
and merchant addresses.
Spending in merchant clusters (merchant
segmentation) or behavioral clusters
(customer segmentation). (e.g., Ave. amount
spent on "Business Travel")
Recent transition (change of address, income,
children)
Recurring transactions indicator (monthly
payments/bills, most frequent telephone
numbers, etc.)
3. Merchant descriptor-based variables
High-Information word tracking (e.g., Ave.
Spending amount on "GOLF"/month)
Average transaction rate in a specific
category (e.g. Golf)
Rate of transactions at merchants with more
than X high-information words overlap with
target
Percent overlap (descriptor matches) between
the account narrative and target descriptor
set
Number of descriptors overlapping between
target description and account description
High-level descriptors based on linguistic
relationships or clustering
4. Other merchant database variables
Merchant "size" (percent of overall
population transaction volume)
Merchant "age" or "tenure" (how long has
the merchant been in business, how long has
the merchant allowed transactions through
this channel?)
Subjective merchant "classes" (service,
retail, utilities, etc.)
Local/travel merchant (average distance from
cardholder's home ZIP)
Geographical spread (for multiple franchise
merchants)
Transaction statistics (average, standard
deviation, min, max transaction amounts)
Transaction statistics for responders versus
non-responders (segment by outcome tags)
Customer loyalty (Average number of
transactions/customer/year)
Percentage of 'Card Not Present' (CNP)
transactions
Number (and percentage) of sales channels
(mail-order, Internet, on-account, etc.)
Hidden Markov Model cluster membership vector At 1225 variables are evaluated for their predictive value alone and in combination with other variables, and the most effective set of variables are selected for inclusion into a model. This can be done using a variety of standard variable sensitivity techniques, including analyzing the predictive performance of the variable in isolation, ranking the variables by linear regression weight magnitude and using step-wise regression. At 1230 pattern exemplars are constructed, using the selected variable selected in 1225.

The pattern exemplars constructed in 1230 are used to train (or construct) a pattern recognition model 1240. The holdout test data set 1245 of exemplars is often required in the optimization process. The model training process is detailed below with reference to FIG. 15. The trained model is then used to score the validation data set 1255 and is evaluated 1250 by an objective function or a Regional Operational Characteristics ('ROC') analysis. If model performance meets the modeling objective (for example, an absolute error criterion, or in a 'champion/challenger' test with an existing model), the process is complete. If model performance does not meet the modeling objectives 1260, the evaluation results are used to update the assessment of variable effectiveness 1265 (using sensitivity analysis or cross-validation techniques), and the process of variable selection 1225 is repeated.

An example of the transaction augmentation process is illustrated in FIG. 14. In this example, a proprietary transaction database 1405 (e.g., credit card transaction histories, phone billing histories, insurance claims/payments, etc.) is used as the source database 105. Such transaction records are typically sorted by account, date, time, respectively. Each record of the "source" (in this case, each transaction) is scanned for valid values in particular data fields 1415 to be used as matching keys. In this example, a merchant identification key 1420 could be a unique merchant identification number, maintained by the creators of the proprietary database. In other cases, the identification key 1420 could be the text description of a merchant, as is typically found on account statements.

The merchant key 1420 is then used to reference a merchant database 1425 and a complete data record on the particular merchant is pulled and appended to a consolidated (enhanced) transaction record 1435. The merchant database contains information and quantities purchased from third party vendors, descriptors derived from public records or the Internet, gross statistics compiled from the transaction database itself, or a combination of all of these sources.

In a similar manner, other databases may be accessed using other data keys. For example, a transaction or account member's ZIP (postal) code 1410 could be used to access a demographic database 1430, yielding information on household income, spending preferences, pet ownership, marital status, etc., which in turn, is appended to the enhanced transaction record 1435.

Finally, for predictive modeling applications, the database of historical outcomes 1160 (responses, profits, risk, customer service calls, etc.) associated with accounts or particular transactions are matched by account number or a transaction identification key and are appended to the consolidated data record 1435.

A schematic representation of the model training process is illustrated in FIG. 15. Model training is the process wherein the set of model parameters is optimized to minimize prediction or classification error. As discussed above, the training exemplars are constructed at 1230 in the variable selection process at 1225 of FIG. 12. An example is a single data record, consisting of:
 1. a transaction or account identifier (key) 1515,
 2. a series of raw or calculated numerical quantities, or variables 1520 (collectively referred to as a "pattern"),
 3. one or more binary or continuously-valued tags 1525, representing the historical outcome associated with the transaction, and
 4. a dataset partition label (Validation tag 1530), which indicates how the exemplar is to be used in the training process.

A model 1540 is a mathematical function or mapping, which takes a numerical pattern as input and returns one or more values indicating a score or prediction 1545 of this pattern. The accuracy of a model's predictions is measured using a comparator 1555 to compare the model 1540 to known outcomes or classifications tags 1525. Model training objective is formally defined by an objective function in the comparator 1555. For most applications, the objective function is a measure of the magnitude of prediction or classification errors 1565 (e.g., distance between target value tag 1525 and model prediction 1545), combined with the costs associated with incorrect decisions based on the model score. Several common objective functions are known in the art (e.g., Bishop, 1995).

This architecture supports several modeling methodologies. For example, model-based regression (linear or logistic regression), non-parametric regression models (e.g., neural networks or Bayesian networks [Bishop 1995], adaptive fuzzy logic models [Ruspini, et al. 1998], etc.), hidden Markov models (Rabiner 1989), decision trees (Breiman et al, 1984), or evolutionary models (Bock, et al. 1997) can all be used.

Models are trained on data records with "training" validation flags 1530. For non-parametric model training, model predictions 1545 are periodically tested against the hold-out test set 1245 of training exemplars, to prevent overtraining, or memorization of the training set exemplars. The test set 1245 of exemplars is randomly flagged with a special validation flag 1530. For standard regression models (e.g., linear or logistic regression), models are not "trained" per se, rather regression coefficients are calculated directly from the data; hence, no test set is required. In the case of Markov models (Rabiner 1989), the variables would represent probabilities of membership in hidden Markov states and the model would be comprised of the conditional probability of an outcome (tag value) 1525 for each hidden state. In the above cases, the final model performance is validated using the separately flagged validation set 1255 of exemplars.

Referring to FIG. 16, a high-level user interface diagram of an embodiment of the data mining module 140 is shown. The data mining module 140 provides a variety of methods for analyzing and visualizing the descriptive data generated by the system in FIG. 16. System user accounts are held in a user database 1605. The user database 1605 contains information relating to user access levels and previous saved work. Updates to this database are managed through a user management system 1610, which is accessed through a user management interface 1615. The user management interface 1615 can be deployed over a browser interface, client-server architecture or as a web service.

User applications 1635 provide different ways of accessing, managing, visualizing and extracting the data held in a transaction archive 1620, account descriptor archive 1625 and an account masterfile archive 1630. This includes the ability to view an account descriptor, search for accounts that match a set of keywords (ranked by their keyword weighting), create lists of accounts that match search keyword criteria, and export those lists to external system. Each of these user applications 1635 is accessed and configured through a user application interface 1640. Some applications export data to external systems through an external integration subsystem 1645. This is typically done for the purpose of interfacing with external marketing or customer services systems, for direct mail marketing distribution and statement-insert marketing distribution.

An account descriptor builder 1650 constructs a summarized keyword description of each account based on combining historical transactions and merchant descriptions. This summarization includes, but is not limited to, summarization by transaction frequency, transaction percentage, or by other attributes such as transaction amount, location or duration. Referring to FIG. 17, the account descriptor builder 1650 includes a merchant lookup module 1715. The merchant lookup module 1715 scans the transaction archive 1620 for each transaction and augments the transaction with a merchant description retrieved from a merchant descriptors file 1710. The augmented transactions are then passed to an account descriptor builder 1725 where the transactions are aggregated. The transactions are aggregated in multiple dimensions, such as by frequency, transaction amount and/or transaction percentage. The account descriptor algorithm 1725 also receives descriptor components derived from data stored in the masterfile archive 1630, including data such as the account owner's location, the account type, the number of years the account has been active, and the current usage levels on the account. The completed initial account descriptors are then stored in an initial account descriptor database 1730.

The initial account descriptors are built as individual records. The account descriptor algorithm 1725 describes accounts by a mix of most common keywords and most discriminating keywords. To build the most discriminating keywords, the initial account descriptors are passed to a population modeling module 1735, which modifies keyword weights against population distributions. The account descriptors are then stored in the final account descriptors archive 1625.

Referring to FIG. 18, a search engine 1800 returns lists of accounts based on rank ordered affinity with the search query and acceptance to passing filter requirements. The search engine 1800 is one of the possible user applications 1635 of FIG. 16. The search engine searches for keywords in the account descriptor archive 1625 in a manner similar to known document-retrieval methods (see, e.g., Baeza-Yates & Ribeiro-Neto 1999, "Modern Information Retrieval", Addison-Wesley, Wokingham, UK). The account narrative can be thought of as, and is processed as, a 'document' describing a particular customer. In a preferred embodiment, search engine queries will employ both exact keyword matches as well as vector search methods (see, e.g., Berry, et al. 1995 "Using linear algebra for intelligent information retrieval"), to facilitate the efficiency at locating related keywords. The account descriptor archive 1625 is sampled to form a uniform random sample 1810 to accommodate varying hardware configurations. The sample 1810 is sorted by keyword weight for each keyword by pivoting account-keyword tables 1815 to build search index tables 1820 for each keyword. This provides high-speed access because the number of search keys is typically small, typically one to ten, relative to the total number of keywords, potentially five thousand to ten thousand.

A user conducts a search by programming the user application interface 1640 with a filter 1830 and a query 1840. The filter 1830 restricts search results to the subset of the population that match specific criteria, typically related to demographics or account status. The query 1840 can be expressed as a sequence of algebraic statements that select specific records based on their expression in that sequence of algebraic statements. For example, the query "must golf may travel less dining" will return a list of accounts that contain a non-zero measure against the keyword "golf", with the final ranking being the weighting of "golf" plus "travel" minus "dining".

More complex queries are established through a linear equation of keyword weights combined with Boolean indicators of the presence or absence of specific keywords. More complex equation forms, such as generalized polynomials and decision trees, can be employed to express more complex decision criteria.

The search engine 1800 determines which subset of the population contains the behavioral/descriptive keywords as requested in the query 1840. The final search result is a union of the filter stage and the query stage, and the list is displayed on the user interface result display 1845. This combines additional data from the masterfile archive 1630 and the transaction archive 1620 to make a complete data visualization tool. From this result list, the user can select an account and then a transaction to explore the description for that transaction's merchant.

Referring to FIG. 19, an example "Define" screen display 1900 produced by an embodiment of the user application interface 1640 shows the results for searching through a credit card portfolio to produce a list of all accounts most interested in hotels. The search key "hotel" is entered in the search window 1905. Longer phrases containing compound keywords can also be entered, using modifiers such as "may", "must", "less" and "not". Upon entering the search query, a list of accounts is extracted, rank ordered in their affinity to the search query. This defines a segment, whose key characteristics can be described in tabular form 1910 and in graphical forms showing distributions such as revolving balance 1915, age 1920 and balance 1925. In addition, the other most common keywords and most discriminating keywords for this segment can be determined and listed 1930. The actual list of accounts in the segment 1935 is displayed. Many fields can be listed in this window, but the key fields are the account number 1940, the affinity to this query 1945 and the other keywords that describe each account 1950.

Referring to FIG. 20, an example "Analyze" screen display 2000 corresponding to the user application interface 1640 shows that, in addition to extracting lists of customers based on behavioral characteristics, segments of the population can be described in terms of how their behaviors change over time. A demographic segment can be selected through various options 2005 and a profile of how the behavior of that segment changes over time can be graphed 2010. Also, a segment can be defined by other characteristics such as product type 2015, and similar characteristics can be displayed for that segment 2020.

An embodiment 2100 of the system using credit card and/or debit card information is described in FIG. 21. Credit and debit transaction data 2105 is applied to the system where new merchants are identified and located on a merchant URL locator 2110 using the Internet. The merchant content 2120 is then extracted and analyzed in the merchant descriptor builder 2125 to populate the merchant descriptor database 2130. The transactions applied to the system are also accumulated in the transaction archive 2115. All transactions on each account and the merchant descriptor associated with each transaction is processed by the account descriptor builder 2135 to populate the account descriptor database 2140. These account descriptors can then be used to locate people with specific interests and behaviors.

An embodiment of the system using SKU level data is described with reference to FIG. 22. Retail transactions, including SKU level (product level) data 2205 are applied to the system. A list of new products 2210 is generated and content 2220 about these products is identified. This product content 2220 is accumulated and analyzed by the product descriptor builder 2225 to create product level descriptions, which are stored in the product descriptor database 2230. The product level transactions applied to the system are accumulated in the transaction archive 2215. Account level descriptors are built from product description information and the transaction archive by the account descriptor builder 2235 and stored in an account descriptor database 2240. These SKU level account descriptors can then be used to locate people who have purchased products relating to specific interests and behaviors.

An embodiment using telecom, or telephone, information is shown in FIG. 23. Call detail records 2305 are applied to the system. The destination of each call is determined using business indices and telephone directories augmented by public information on merchants and service providers. For those calls that have merchant or company websites, content is located with a call destination URL locator 2310 and stored in the call destination URL content database 2320. The call destination descriptor builder 2325 analyzes this call destination content and populates the call destination descriptor database 2330. The call detail records applied to the system are accumulated in the transaction archive 2315 and then combined with the call destination descriptors 2330 by the account descriptor builder 2335 which places the final account descriptors in the account call descriptor database 2340. These account call record descriptors can then be used to locate telephone account owners and cell-phone owners with specific interests and behaviors.

An embodiment using demographic data is shown in FIG. 24. Demographic data records 2405 are applied to the system and accumulated in a demographic data archive 2415. New demographic field values are identified and content is located on new demographic indicators 2410. This content is collected into a demographic data URL content database 2420 and then applied to the demographic descriptor builder 2425 to populate the demographic descriptor database 2430. The demographic descriptors 2430 and the demographic archive 2415 are then combined by an account descriptor builder 2435 which places the final account descriptors in an account demographic descriptor database 2440. These demographic descriptors can then be used to locate people with specific interests and behaviors through data mining systems such as the search engine, or through predictive modeling systems.

An embodiment using browser transaction information is shown in FIG. 25. Browser view records 2505 from cookies or other browser view tracking methods are applied to the system. Content 2510 from each browser view is located and collected in a browser view URL content database 2520. The browser view content 2510 is then analyzed by a browser view descriptor builder 2525 to create browser page descriptors 2530. The browser view records 2505 are aggregated to build a browser view archive 2515. This data on each account in the browser record archive 2515 is then combined with the browser view descriptors 2530 by a user descriptor builder 2535 to build user level account and browser view descriptors 2540. These browser descriptors can then be used to locate computer users with specific interests and behaviors through data mining systems such as the search engine, or through predictive modeling systems.

Many other possibilities of source database and reference databases are conceived. For example, in one embodiment the source database contains insurance transactions, and the reference database contains information regarding insurance products, claims and/or insurance evaluations. In one embodiment the source database can contain product inventories, and the reference database contains information describing products. In one embodiment the source database can contain Internet browser view transactions, and the reference database contains the Internet pages of the browser view transactions. In one embodiment the source database contains retail transactions at an individual product level, and the reference database contains product information from catalogs. In one embodiment the source database contains investment transactions and the reference database contains public information regarding companies, mutual funds and/or other investment interests.

Specific blocks, sections, devices, functions and modules may have been set forth. However, a skilled technologist will realize that there are many ways to partition the system of the present invention, and that there are many parts, components, modules or functions that may be substituted for those listed above. Although specific data, such as text, and specific unstructured data, resources, such as the Internet and World Wide Web, other embodiments may use different specifics. Additionally, other software languages may be used in other embodiments.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

Accordingly, it is to be understood that the invention is not to be limited by the specific illustrated embodiment, but only by the scope of the appended claims.

What is claimed is:

1. A computerized system for augmenting data from a source database with data from a reference database to generate an augmented database that can be used for predictive modeling, comprising:
   a source database comprising a plurality of transaction data records with each transaction data record having at least one field identifying a merchant, product and/or service;
   a merchant identifier database comprising a plurality of reference addresses and value description identifiers for merchants, products and/or services;
   a reference database;
   an address locating module configured to search the reference database to locate references for merchants, products and/or services identified in the source database;
   an account description database;
   a transaction augmentation module, configured to attach the value description of a particular merchant, product and/or service to the transaction data records and store the resulting combined record in the account description database; and
   a merchant analysis builder module configured to condense the references provided by the address locating module into a value description and store the value description in the merchant identifier database.

2. The system of claim 1, further comprising an account descriptor builder module configured to generate descriptive account records from the merchant identifier database and the source database.

3. The system of claim 1, further comprising a lexicographic database configured to index value description identifiers to keywords.

4. The system of claim 1, wherein the reference database comprises the Internet.

5. The system of claim 1, further comprising a predictive modeling module configured to predict future behavior of accounts, merchants, or other entities, using data from the account description database.

6. The system of claim 1, further comprising a data mining search engine configured to conduct keyword searches of the account description database to identify accounts, merchants, or products.

7. A computerized method of augmenting data from a source database with data from a reference database, the method comprising:
   retrieving at least one data record recording an event from the source database;
   identifying a field in the data record that specifies an entity;
   locating reference data from the reference database that describes the entity specified by the entity field;
   processing the reference data to form a set of keyword descriptors describing the entity;
   augmenting the data record with the keyword descriptors to generate an augmented data record describing the entity;
   building an account descriptor database that includes at least one data record that correlates the at least one event with the description of the entity from the augmented data record;
   searching the account descriptor database for selected data records that meet a desired criteria; and
   storing said selected data records for further processing.

8. The method of claim 7, wherein the locating reference data includes locating data in an unstructured database.

9. The method of claim 7, wherein the reference database includes at least a portion of the Internet.

10. The method of claim 9, wherein the locating reference data includes locating electronic pages using the entity specified in the at least one data record.

11. The method of claim 10, wherein locating reference data further spidering for additional electronic pages cited within the located electronic pages.

12. The method of claim 7, wherein locating reference data includes reducing natural language text to keyword descriptors.

13. The method of claim 7, further comprising validating the located reference data using data from the at least one data record.

14. The method of claim 7, further comprising storing the augmented data record in a merchant database.

* * * * *